United States Patent

Takiyasu et al.

[11] Patent Number: 5,537,414
[45] Date of Patent: Jul. 16, 1996

[54] METHOD OF WIRELESS COMMUNICATION BETWEEN BASE STATION AND MOBILE STATION AND MULTIPLE ACCESS COMMUNICATION SYSTEM

[75] Inventors: Yoshihiro Takiyasu, Higashimurayama; Eiichi Amada, Tokyo; Hidehiko Jusa, Higashimurayama; Tomoaki Ishifuji, Tokyo; Shuichi Adachi, Hadano; Genichi Ishii, Hachioji, all of Japan

[73] Assignee: Hitachi, Ltd., Tokyo, Japan

[21] Appl. No.: 87,080

[22] Filed: Jul. 7, 1993

[30] Foreign Application Priority Data

Jul. 7, 1992 [JP] Japan ..................................... 4-179679
Mar. 5, 1993 [JP] Japan ..................................... 5-044879

[51] Int. Cl.$^6$ ................................................. H04J 3/16
[52] U.S. Cl. ..................... 370/95.1; 370/95.3; 455/54.2; 371/33
[58] Field of Search ..................... 370/95.1, 95.2, 370/95.3, 85.7, 85.8, 79, 80, 105.1; 379/60, 63; 455/11.1, 33.1, 34.1, 34.2, 54.2, 13.4, 38.3, 67.3, 69, 116, 127; 340/825.08; 371/33

[56] References Cited

U.S. PATENT DOCUMENTS 4,356,484  10/1982  Eckhardt ................................. 370/95.1
4,811,421  3/1989   Havel et al. ............................... 455/69
5,003,619  3/1991   Morris et al. ............................. 455/127
5,239,545  8/1993   Buchholz ................................. 370/95.1
5,297,144  5/1994   Gilbert et al. .......................... 370/95.2

*Primary Examiner*—Melvin Marcelo
*Assistant Examiner*—Huy D. Vu
*Attorney, Agent, or Firm*—Antonelli, Terry, Stout & Kraus

[57] ABSTRACT

In a communication system having a base station for controlling a transmission right and a plurality of substations, a substation having data to be transmitted transmits the number of necessary fragments and its address to a request field of a communication frame. The base station uses a plurality pair of fragment slots and reply slots following the request field in the communication frame to transmit an address of a substation permitted to transmit data, to each fragment slot. The substation permitted to transmit data transmits the address of a destination substation and the data to a predetermined field following the address in one fragment slot. The destination station transmits a reply signal indicating the reception state of the data to the reply slot paired with the fragment slot. If the base station detects from the reply signal that the destination station failed in receiving the data, the base station instead of the substation first transmitted the data transmits the destination address and data received at the fragment slot to the next fragment slot.

25 Claims, 20 Drawing Sheets

| STATUS OF BASE STATION \ STATUS OF DESTINATION STATION | SUCCESS IN RECEIVING: ACK / NON-REPLY (BROADCAST) | FAIL IN RECEIVING: NAK / REPLY ERROR / NON-REPLY (INDIVIDUAL) |
|---|---|---|
| SUCCESS IN RECEIVING | — | RETRANSMISSION FROM BASE STATION |
| FAIL IN RECEIVING | — | RETRANSMISSION FROM SOURCE STATION |

FIG. 16

| REPLY TYPE (520A) | BIT PATTERN (520B) | MEANING OF NOTICE (520C) |
|---|---|---|
| RACK (521) | 00011101 | THE REQUEST HAS BEEN ACCEPTED |
| RNAC (522) | 11100010 | THE REQUEST HAS BEEN REJECTED DUE TO DATA ERROR |
| RRJC (523) | 11100001 | THE REQUEST HAS BEEN REJECTED DUE TO A REASON OTHER THAN DATA ERROR |
| NONR (524) | 11100011 | NO REQUEST HAS BEEN ISSUED |

Table 520

FIG. 17

| ATTRIBUTE (530A) | BIT PATTERN (530B) | MEANING OF NOTICE (530C) |
|---|---|---|
| NFD | 00011101 | THE FRAGMENT SLOT IS ASSIGNED TO TRANSMIT A NEW FRAGMENT DATA |
| BRD | 11100010 | THE FRAGMENT SLOT IS ASSIGNED TO RETRANSMIT A DATA FROM A BASE STATION |
| SRD | 11100001 | THE FRAGMENT SLOT IS ASSIGNED TO TRANSMIT A DATA FROM A SOURCE STATION |

Table 530

FIG. 18

| COMMUNICATION TYPE | SUCCESS IN RECEIVING | FAIL IN RECEIVING |
|---|---|---|
| INDIVIDUAL | ACK (00011101) | NAK (11100010) |
| BROADCAST | NON-REPLY | NAK (11100010) |

540A = COMMUNICATION TYPE column; 540B = SUCCESS IN RECEIVING column; 540C = FAIL IN RECEIVING column; 540 = table

| RESULT OF REPLY | | PROCESSING AT BASE STATION |
|---|---|---|
| INDIVIDUAL COMMUNICATION | ACK | COMPLETION OF TRANSMISSION |
| | NAK | CONTROL FOR RETRANSMISSION |
| | UNDEFINED PATTERN | CONTROL FOR RETRANSMISSION |
| | NON-REPLY | CONTROL FOR RETRANSMISSION |
| BROADCAST COMMUNICATION | ACK | |
| | NAK | CONTROL FOR RETRANSMISSION |
| | UNDEFINED PATTERN | CONTROL FOR RETRANSMISSION |
| | CARRIER | CONTROL FOR RETRANSMISSION |
| | NON-REPLY | COMPLETION OF TRANSMISSION |

F I G. 26
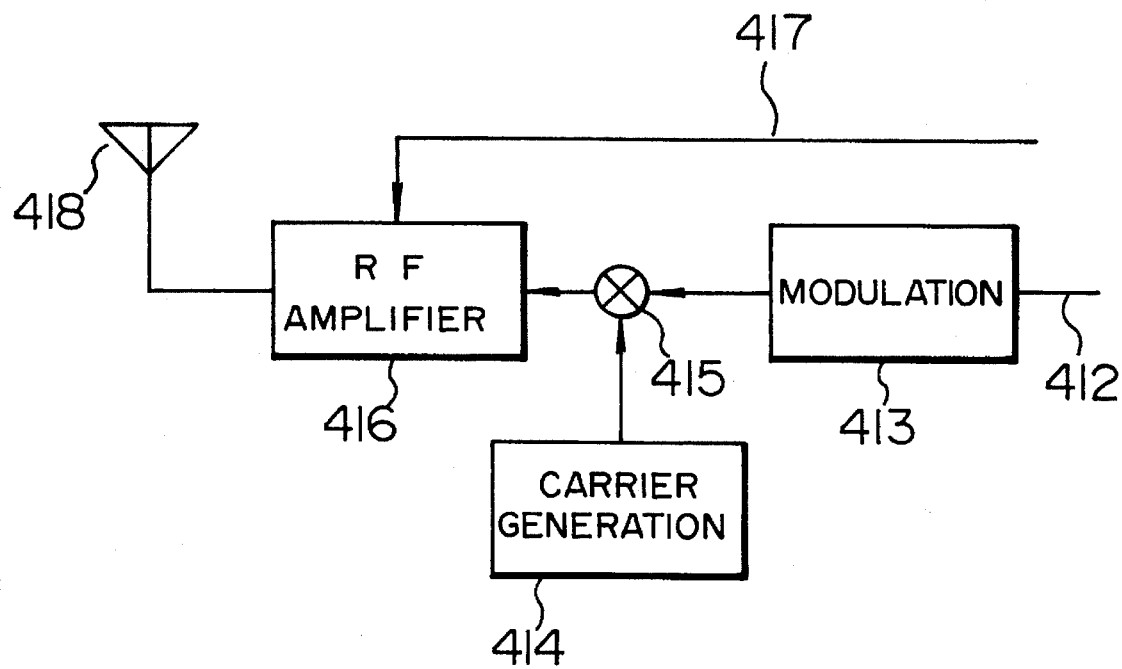

METHOD OF WIRELESS COMMUNICATION BETWEEN BASE STATION AND MOBILE STATION AND MULTIPLE ACCESS COMMUNICATION SYSTEM

BACKGROUND OF THE INVENTION

1. Field of the Invention

The present invention relates to a communication method and system suitable for radio link systems, and more particularly to a communication method and system using a multiple access control wherein access rights to transmit data from a plurality of mobile stations (substations) are managed by a base station (control station).

2. Description of the Related Art

A polling method and a pre-assigned Time Division Multiple Access (TDMA) method are known examples of a multiple access control method in which a control station or base station collectively controls a plurality of terminal equipment to allow them to access a communication medium (communication channel) and transmit data.

In the polling method, a base station inquires of each terminal equipment (hereinafter called a substation) whether it has any data to transmit. Therefore, there is no possibility that a plurality of will transmit data at the same time and cause the data to collide on a communication medium, and this method has an advantage that an access right can be assigned to each substation equally. However, a large bandwidth of the communication medium is occupied by polling messages from the base station to the substations.

In the pre-assigned TDMA method, the base station pre-assigns an access time for accessing a communication to each substation and each substation periodically transmits data at the access time assigned to it. There is no possibility that data from a plurality of substations will collide on the medium, and there is no need of transmitting polling messages from the base station the substations. This method therefore simplifies the multiple access control.

With the TDMA method, however, the access time is assigned even if a substation does not need to transmit data. Therefore, if this method is applied to a system such as a Local Area Network (LAN) in which bursty data transmission occurs between terminal equipment, the efficiency of use of the communication medium is degraded. Especially in a wireless LAN in which mobile stations are used as substations, registration/removal of a mobile station to/from a communication area (cell) occurs frequently due to the movement of the mobile station. It is necessary for a control station to assign a new bandwidth to the mobile station, degrading the efficiency of use of the communication medium.

As a conventional technique offering a solution to these problems, there is known a split-channel reservation multiple access method. With this method, a communication frame is split into a control data transmission field and a message transmission field. The control data transmission field is further divided into a transmission request field having a plurality of slots, and reply fields corresponding to respective ones of the slots. When a substation requests an access right to a base station by using one of the slots in the transmission request field, the base station uses the request field corresponding to the slot to notify the substation of a usable field in the message transmission field. An example of the split-channel reservation multiple access method is described, for example, in "Wireless In-Building Network Architecture and Protocols", IEEE Network Magazine, November 1991, pp. 31–38 (hereinafter, this method is called conventional method 1).

According to the conventional method 1, at each substation assigned an access right by the base station, information (a message) to be transmitted is divided into a plurality of information blocks each having a fixed length, and each information block is transmitted in a fixed length packet field (fragment) called a "fragment slot" defined in the message transmission field.

Information blocks transmitted in fragments are received by the base station which in turn transmits the information blocks in fragment slots of another communication frame and transmits them to a destination substation. If the information block transmission to the destination station fails, the source substation retransmits the same information blocks.

The message transmission field has a plurality of fragment slots. Each fragment slot is constituted by an information field in which an information block is set, a block number field in which stored is the block number indicating the location of an information block in one message, and a code field in which an error correcting/detecting code is set.

According to the conventional method 1, a substation requests data transmission in units of fragment by a slotted ALOHA method, using one of the request slots defined in the control information transmission field. If a collision occurs because another substation uses the same request slot, these substations use another communication frame after the collision frame and request again data transmission by using a randomly selected request slot of the frame.

In a conventional success/failure reply relative to a message transmitted from a source station to a destination station, a reply method has been used in which an acknowledge (ACK) pattern is sent back for a reception success and a non-acknowledge (NAK) pattern is sent back for a reception failure.

This method is, however, associated with a problem regarding the broadcast communication for transmitting the same message to a plurality of substations. For example, in a ring-LAN, the NAK pattern sent from a LAN node may be changed to the ACK pattern at another downstream LAN node. In an Ethernet (IEEE 802.3 LAN) or wireless LAN in which a single communication medium is shared by a plurality of substations, if reply signals are sent from a plurality of destination substations, a collision occurs on the communication medium so that ACK and NAK patterns set in the reply fields may be changed.

An example of a conventional technique solving these problems is described, for example, in "A Multicast ARQ Scheme for the Vehicular Communications", the 13th Symposium on Information Theory and Its Applications, pp. 623–626 (hereinafter, this method is called a conventional method 2).

According to the conventional method 2, a NAK signal is sent back from each substation only when the reception of a broadcast message is failed, and a broad reply field is used to allow the reception of replies and reduce a collision probability of NAK signals. In this fashion, even if a collision occurs, the same frame can be used to send back again the reply signal.

It is known that the transmission power of an antenna in a wireless network attenuates in inverse proportion to a square of a distance ratio between transmission and reception stations. Even if the same transmitting power is used in transmitting a signal from a plurality of substations differently remoted from the base station, each received power is sensed at the base station different for respective substations.

For example, assuming that two substations A and B located respectively at distances 1 m and 10 m from the base station transmit signals at the same transmitting power, the signal power of the substation A received at the base station is 100 times as large as that of the substation B.

If the conventional method 1 is applied to a wireless network, the following two cases of receiving transmission requests may occur depending upon the position (distance) relationship between a base station and substations, when a collision of transmission requests issued by a plurality of substations occurs on the same request slot.

In the first case, a plurality of transmission requests are mixed at substantially the same receiving power, and so all the transmission requests are judged as error signals.

In the second case, the transmission request having the maximum receiving power is correctly processed.

As the transmission power attenuates as described above, a transmission request made by a substation nearest the base station is most likely to have a transmission right over other substations, on the assumption of no shadowing.

Consider for example that two substations A and B transmit a packet of 100 bit length at the same transmitting power at the same time, and that the packets are received as signals a and b at receiving powers Sa and Sb. Assuming that the signal b is noises of the signal a, the signal a has a high possibility of being detected by the base station as a normal signal if the following relationship is satisfied:

$$Sa/(N+Sb)<\alpha$$

where $\alpha$ is an SN ratio at a bit error rate 1E–2. This situation corresponds to the second case.

The right side term of the above formula is about 9 dB in the case of Quadrature Phase Shift Keying (QPSK) using differential detection, according to the calculation described in the document "Digitalization Technology Mobile Communication", p. 77, TRICEPS in "Bit Error Rate vs. Signal to Noise Ratio Characteristics". Since $Sa= r*r*Sb$ and $Sb/N$ (average error rate 1E–4 at radio link)> 1, the distance $r \geq 2.8$ m.

The communication coverage area of a base station in a wireless network is generally about several 10 m to several 100 m in radius. Therefore, the second case occurs easily in practical applications.

The second case is an unfair access control because a particular substation is preferentially assigned a transmission right upon occurrence of a contention between transmission requests. In the document of the conventional method 1, however, no means is presented for realizing a fair access control independent of the locations of substations.

The unfair access in the second case can be dissolved, for example, by controlling the transmitting power at each substation to be received as a constant power at the base station. According to a conventional general control method, each substation monitors the receiving power of a signal transmitted from the base station to estimate the distance to the base station and control the transmitting power at the substation. An example of this control method is described, for example, in "On the System Design Aspects of Code Division Multiple Access (CDMA) Applied to Digital Cellular and Personal Communications Networks", IEEE VTS '91, Proceedings, pp. 57–62 (hereinafter called a conventional method 3).

A method such as the conventional method 1 in which all messages from source to destination substations are transmitted always via the base station, has advantages of an availability of central communication management at the base station and moreover of a reduction of hidden terminals specific to a wireless LAN. Namely, with the method of direct communications between substations, communication is disabled if any obstacle is present between substations. However, with the method of indirect communications via a base station, if the base station and substations are located line-of-sight, the effects of an obstacle therebetween can be avoided.

With the conventional method 1, however, upward channels from a substation to a base station and downward channels from the base station to a substation are required to be separately provided in terms of frequency and time. Therefore, the transmission efficiency is lowered to a half of that of the method of direct data communications between substations, posing a problem of an inability of using transmission resources efficiently.

In a wireless LAN, the size of each fragment is generally about several hundreds bytes. The maximum length of a message transmitted by a terminal equipment (substation) in a wireless LAN is about 1.5K bytes to ten and several K bytes far greater than the fragment size. If the access request is made in units of fragment as in the case of the conventional method 1, each substation is required to execute an access request operation several to several tens times in transmitting one message. This access right request operation is executed also in transmitting again the same message. The collision probability of access right requests on the request field increases if the conventional method 1 is applied to a wireless LAN, posing a problem of lowered efficiency.

The communication frame structure of the conventional method 1 does not prepare a special field for use by a destination substation to notify a reply to the source substation indicating a reception success/failure of a transmitted fragment. As a result, the destination substation is required to obtain a fragment slot in the manner similar to the access operation to a fragment by the source station, and is required to send back the reply message. This necessity is also one of the factors degrading the efficiency and increasing a transmission wait time.

Furthermore, a delay of a reply from a destination substation leads to a lowered end-to-end throughput. As an example of a data retransmission method aiming at preventing the degradation of efficiency due to a reply delay, there is known, for example, a selective retransmission method wherein only a fragment failed in reception is retransmitted. This retransmission method is associated with a problem of a need of a complicated buffer management function at a substation.

If the length of the fragment field is designed to be short, the field occupied by the fragment header becomes large so that the size of each data block becomes small, degrading the transmission efficiency. Conversely, if it is designed to be long, a probability of data retransmission due to a failure of data transmission becomes large and the amount of retransmission data increases, degrading the transmission efficiency. There is therefore an optimum size range of a fragment length determined from the transmission efficiency of each system.

In a LAN system, the protocol higher than the logical link control (LLC) layer does not depend on the type of a transmission medium. An interface from the media access control (MAC) layer to the LLC layer is generally required to have a high quality of a bit error rate of 1E–8 or higher. Therefore, it is necessary for a wireless LAN having an average bit error rate of about 1E–4 to improve the bit error rate of 1E–4 to 1E–8 or more at the layers lower than the MAC layer.

In such a case, Hamming codes or BCH codes for example are used. Taking into consideration the coding efficiency and an original bit error rate of about 1E–2 under a hidden terminal environment, it is necessary to use several tens bytes for the correction block. Accordingly, in the frame structure of the conventional method 1 wherein the fragment structure has only one error correcting and detecting field, the fragment length is limited by the size of the correction block. The actual fragment length becomes much shorter than the optimum fragment length calculated based on the error block retransmission and header overhead. It is therefore difficult to gain a maximum efficiency if this fragment structure is used.

Another factor affecting the communication efficiency in the split-channel reservation multiple access method is a success rate at the request field. As the number of request slots of the request field of each communication frame is increased, an apparent access request success rate is improved. However, the size of the message transmission field (information field) becomes small as the size of the request field becomes large, being unable to improve the substantial communication efficiency.

In an actual system, the communication efficiency depends largely upon the access request retransmission procedure, i.e., backoff algorithm, to be executed when a plurality of access requests collide on the same request slot. With the conventional method 1, however, while an access request retransmission operation upon a collision is repeated, a new access request may be issued from another substation, increasing a collision probability and resulting in congestion of the system.

For the conventional method 2 regarding the reply to the reception of broadcast communication, it is impossible to make a collision probability of NAKs zero and provide an essential solution to the collision problem. With this method 2, if the size of the communication frame is limited, the message transmission field is required to be made narrow as the reply field is broadened, lowering the efficiency.

In an in-door wireless communication environment, transmitted radio waves are reflected by a wall or the like so that the same signal reaches a reception station via different paths. The transmission path is affected by the opening/closing of doors, sway of blinds or curtains, motion of people, or other obstacles. Therefore, radio waves change their phases to make the amplitudes smaller or larger. The Doppler frequency is about several tens Hz in this case, and the frequency of communication frames are generally several tens Hz. As a result, even if a substation tries to control its transmitting power in accordance with the receiving power from the base station, it is difficult to precisely determine the transmitting power because a difference between an estimated time and a transmission time is in the order of the fading period.

An unfair problem of the access control caused by a difference between receiving powers in a wireless network is not essentially unfair, when compared to an access control method with respect to a collision in ALOHA, slotted ALOHA, CSMA, or CSMA/CD in a wired network environment. Specifically, in the wired network environment, if an access request collides, the communication fails by all means. In the wireless network environment, if an access request collides with another access request from another substation, the communication fails in one case and succeeds in another case at the substation nearer to the base station. From this viewpoint, it can be said that the communication efficiency is better. The main issue of the communication unfair problem resides not in that there is a surviving substation, but in that the surviving substation is limited to the substation nearest the base station.

Although the conventional method 3 can deal with the unfair access, it is practically impossible to apply this method to a wireless network to correctly control the transmitting power at a substation. Even if the transmitting power could be controlled correctly, the above-described success chance is lost, resulting in a lower communication efficiency. In this context, this method 3 is not always optimum.

For a local network in which one of a plurality of substations which obtained a transmission right is allowed to transmit data, there is known a control method in which a transmission right priority can be assigned to a particular substation. For example, in a Token Ring IEEE 802.5, a priority bit is assigned to each packet. CSMA/CD with priority is also presented, for example, in the proceedings on IEICE Conference '81, 1–276 and in the Journal of Information Processing Society of Japan, Vol. 23, No. 12, '82, pp. 1139–1140.

However, such priority control becomes a complicated control at the MAC layer level. Such priority control is not suitable for the access control method for a network wherein a collision detection function is not provided to each substation, and wherein CSMA, slotted ALOPHA or the like is used assuming a collision between a plurality of access requests.

SUMMARY OF THE INVENTION

It is an object of the present invention to provide a communication system and method with an improved communication efficiency, capable of a base station's controlling an access request transmitted to a data transmission channel from a substation.

It is another object of the present invention to provide a terminal equipment with an improved communication efficiency particularly for a wireless LAN.

It is a further object of the present invention to provide an access control method and a communication protocol applicable to a communication system having a base station and a plurality of substations, capable of each substation's easily obtaining an access right to a communication channel.

It is a still further object of the present invention to provide a communication system and method applicable to a system having a base station and a plurality of substations, wherein a retransmission operation and a reception reply to broadcast communication can be efficiently performed.

It is another object of the present invention to provide an access control method capable of each terminal equipment's giving an access right in a fair manner without dynamically controlling the transmitting power in accordance with the distance between a terminal equipment and a base station.

It is another object of the present invention to provide a priority control method suitable for a wireless network system without a need of processing at a MAC layer level.

In order to achieve the above objects of the present invention, there is provided a communication system having a base station for controlling an access right and a plurality of substations, communications between substations and between a substation and the base station being performed using a communication frame including at least a synchronizing signal field, a request field, and an information transmission field, wherein each substation having data or a message to be transmitted issues an access right to the request field of the communication frame, and immediately after receiving an access permission at a predetermined field of the same communication frame transmitted from the base station, the substation transmits the data or the message by using the information transmission field of the same communication frame. The request field of a communication frame has a plurality of request slots, and the information transmission field has a plurality of fragment field.

According to the present invention, for example, each substation having a message to be transmitted receives a predetermined signal pattern transmitted from the base station at the synchronizing field of a communication frame, and at a request slot of the request field following the predetermined pattern, transmits a data transmission request (access request) containing an identifier of the substation as a source station.

The access request transmitted by the substation at the request slot of the request field is received by the base station. The base station temporarily stores the access request transmitted from the substation, and sends back access permission information to the substation at the information transmission field defined after the request field in the communication frame.

The fragment field contained in the information transmission field includes a first part and a second part following the first part. The first part is set with the access permission information, and the second part is set with information to be transmitted. The base station issues the access permission information to the substation by setting to the first part the identifier of the substation to be permitted to use the fragment field.

Each substation transmitted an access right checks the first part of each fragment field of the information transmission field. If the identifier of the substation is detected, the substation judges that an access to the fragment field was permitted, and transmits packet information (fragment) to the second part following the first part. The packet information includes header information containing the identifier of a data or message destination substation and information to be transmitted (data block).

A message to be transmitted from each substation is generally longer than the length of a data block capable of being transmitted by one fragment field. It is therefore necessary to use a plurality of fragment fields in transmitting one message. According to one embodiment of the present invention, each substation designates the number of fragments necessary for transmitting a message by using the access request signal to be transmitted to the request field. The base station schedules access requests (corresponding in number to the requested fragments) issued from a plurality of substations at the request field of the communication frame, and then gives the access permission.

In this manner, a substation is permitted to access a plurality of consecutive fragment fields, if possible, in the same communication frame. The substation allowed to access can transmit a plurality of data blocks constituting a message, by using a plurality of fragment fields of the same communication frame.

If the number of fragment fields requested by a substation is greater than the total number of fragment fields in the information transmission field of one communication frame, the base station gives the substation an access permission at the communication frame at which the access right was requested and at the immediately following communication frame or frames. In order to efficiently use fragment fields, the base station may accept all access requests transmitted to one communication frame from substations, to thereafter give a permission to each access request at the following communication frame or frames.

One aspect of the present invention resides in that the base station temporarily stores information transmitted to the fragment field by a substation for the later use of it in retransmission.

If a destination station (substation) fails in receiving the transmitted information, the base station retransmits the temporarily stored information to the fragment field and the destination station receives it.

A judgement whether a destination station has correctly received transmitted information is made as follows. For example, a reply field is defined for each fragment field of the communication frame at an area following the second part at which information was transmitted. The destination station sets to this reply field the information indicating whether the transmitted information has been correctly received, and the base station checks this reply field.

With the frame structure described above, the base station issues an access permission at the first part of the fragment field, the source station detects this permission and transmits information, and the destination station performs a reply operation at the following reply field. If a NAK reply indicating a reception failure is sent back, the base station instead of the substation can retransmit the temporarily stored information for the reception failed information.

This retransmission of information executed upon a reception failure not by a source station but by the base station has the following advantage. For example, in a wireless LAN, there are many occasions that even if there is a hidden terminal, i.e., a destination station which cannot receive radio waves from a source station because of obstacles, the destination station may correctly receive radio waves from the base station. Accordingly, a possibility of correctly receiving the retransmitted information at the destination can be improved.

Another aspect of the present invention resides in a communication protocol, particularly the structure of the information transmission field of a communication frame.

According to a typical embodiment, the communication frame has an identification field at the header of each fragment field to which information is transmitted (the information is called simply fragment hereinafter where applicable) and an error detecting code field at the end of each fragment field. The reply field for setting a reply by a destination station is provided immediately after each fragment field.

With the communication frame format described above, when a destination station detects an uncorrectable data error in the received fragment, it sends back a NAK reply at the reply field corresponding to the received fragment field, to allow a retransmission request of the fragment to be issued quickly.

In broadcasting the same information to a plurality of substations, a reply from a destination station is limited only to a NAK reply representing a reception failure. Accordingly, even if NAK replies from a plurality of substations collide on the same reply field, the base station detects it carrier indicating a failure of broadcast communication, and can broadcast again the same information.

According to a preferred embodiment of the present invention, a source station divides information to be transmitted (fragment) and set to each fragment field, into a plurality of correction blocks each having a relatively short length, and generates an error correcting code for each correction block.

In a communication environment having a very poor transmission quality, it occurs that all correction blocks in one fragment field cannot be fully corrected and a retransmission request is frequently issued. As a means for reducing the number of retransmissions under such a poor transmission quality, the following scheme may be used. Namely, a redundant transmission mode is provided wherein a source station or a base station can set the same information to be transmitted to a plurality of or all of the correction blocks in one fragment field. If the destination station can receive any one of a plurality of correction blocks, a NAK reply is not sent back even if uncorrectable blocks are present. In this case, a fragment transmission mode is notified to a destination station by setting, for example, identification information to a mode field provided at the header of the fragment field.

A further aspect of the present invention is as follows. When a base station detects a collision of a plurality of access requests on the same request slot in the request field, the base station sets control information to the request field of, for example, the next communication frame. The control information indicates a temporary inhibition of an access request from a substation other than the substation failed in the access request at the preceding communication frame. For this temporary access request inhibition, it is preferable to set the control information such that the inhibition is executed when the number of request slots in the contention state exceeds a predetermined threshold value, and is released when it becomes less than the predetermined threshold value.

The access control method of the present invention features in that an access request (transmission right) is controlled not to be occupied by a particular substation assuming that there is a surviving substation when a plurality of access requests collide on the same request slot. For example, for the limitation of an access request, there is set a maximum value (window) of access requests usable by a substation during a predetermined period (limit cycle). If the number of access requests issued by a substation during the same cycle exceeds the window value, the substation is inhibited to issue an access request until the next cycle. Instead of limiting the number of access requests, the number of fragments to be reserved or the number of accepted requests may be limited.

According to one embodiment of the present invention, a base station dynamically changes the limit cycle time of the access requests in accordance with the communication state between substations. For example, the base station monitors the request field of each communication frame. When it is detected that the number of access requests from a substation becomes zero or less than the predetermined threshold value before the limit cycle time is completed, a new cycle is used so that another substation reached the window value and in the cycle wait state can be given a new access request chance, reducing the wait time.

Cycle information representative of a renewal of the limit cycle is set by the base station to a predetermined field of each communication frame, for example, to a part of the synchronizing signal field. The substation waiting for a renewal of the limit cycle checks the cycle information, and when the limit cycle is renewed, resets the window value to the maximum value to resume the control of the number of access requests.

As the cycle information, a sequence number for example is used which is changed each time a cycle is renewed. Instead of the sequence number, a flag may be set in the communication frame immediately after the cycle renewal.

According to a preferred embodiment realizing a dynamic renewal of the limit cycle, an inquiry field for a substation is defined in each communication frame separately from the request field. By using this inquiry field, whether an access request is necessary (or to be reserved) at the next communication frame is inquired to the substation. If the number of access requests to be reserved for the next communication frame is zero or a predetermined threshold value or less, the limit cycle is renewed at the next communication frame. With this arrangement, whether the renewal of the limit cycle is necessary can be judged one frame earlier, as compared to the case of checking the presence/absence of actual access requests in the request field. Accordingly, a substation in a limit cycle renewal waiting state can have a faster release of the access request limit.

For the priority control in a wireless network system, the substation with a higher priority order is controlled to survive over the substation with a lower priority order under a contention of access requests. Specifically, the transmitting power of each substation is controlled so that the priority order becomes proportional to the receiving power intensity at the base station. There are provided first and second communication modes. In the first communication mode, a normal transmitting power is used. In the second communication mode, a transmitting power higher than the first communication mode is used to make the substation with the higher transmitting power survive. In this manner, an access request in the second communication mode survives under the contention state. Each substation may be fixedly provided with one of these two communication modes, or may selectively use one of them at the time of information transmission.

According to the communication method and access control method of the present invention, in each communication frame to which an access request is transmitted from each substation, a fragment field serving as the information transmitting field is defined after the request field. The base station assigns a substation with an access right at the first part of the each fragment field. The substation gained the access right transmits an information block to the second part of the fragment field. Accordingly, each substation can output and process a message quickly and with a short wait time.

When a wireless LAN is applied to the present invention, information transmitted to the fragment field from a source station is received by the base station and another substation in the cell. Accordingly, assuming that the destination station is located at the position allowing a direct reception of transmitted radio waves, a high information transmission performance can be obtained as compared to the method wherein information is transmitted via the base station to the destination station.

Even if source and destination stations are located in the same cell, the destination station sometimes becomes temporarily a hidden terminal due to obstacles intervening between the two substations. According to the present invention, the base station temporarily stores information transmitted to and received at each fragment field. If there is a retransmission request (or if there is no reception success reply) from the destination station at the reply field defined at a third part of the fragment field, the base station retransmits the information by using the next fragment field. It is therefore possible to complete the retransmission operation without giving an access right to the source station and re-assigning the bandwidth. In this case, communications between the base station and substation are less affected by the obstacles which caused a reception failure between substations, providing a small possibility of occurrence of communication error.

Since the already transmitted information is retransmitted at the next fragment field to that with the communication error, the destination station simply waits for the next fragment immediately after the retransmission request to receive the retransmitted information. Similar to the Stop and Wait retransmission method, the capacity of a necessary buffer at each substation becomes small and the retransmission control becomes easy.

In a network having a transmission rate of about 10M bps for example and the radius of about 10 m of the cell supervised by each base station, there is almost no degradation of throughput to be caused by the above method wherein the next information block is transmitted after a reception of a reply from the destination station.

In the case of broadcast communications applying the communication method of the present invention, if retransmission requests from a plurality of destination stations collide on the same reply field, it is judged that the broadcast communication on the fragment has failed, and the information is retransmitted from the base station. It is therefore unnecessary to prepare a broad reply field for use by broadcast communication replies by a plurality of substations.

According to the communication method and access control method of the present invention, a substation is controlled to survive under an access request contention. The resultant throughput can be improved correspondingly, and the transmitting power control is not necessary which has otherwise been performed in accordance with the distances to the base station. In this case, a method is incorporated wherein the number of access requests at each substation is limited at each predetermined limit cycle period. It is therefor possible to provide a fair communication environment with a good throughput in the long term, although an unfair problem occurs temporarily depending upon the distance to the base station in each cycle. In each communication frame proposed by the present invention, a field for inquiring a presence/absence of an access request (transmission right reservation) is defined separately from the request field. In this case, the base station checks the transmission right reservation status at the inquiry field so that a wait time at each substation to be caused by the limit of the number of access requests can be reduced and the limit cycle can be dynamically changed.

In a modification of the present invention, each substation has first and second transmission modes having different transmitting powers to intentionally permits a presence of a survived substation under an access request contention. An ordinary substation uses the first communication transmission mode, and the substation having a higher priority order than the ordinary substation uses the second transmission. In this manner, the substation having the higher priority order can be assigned the access right under the access request contention. In this case, the limit of the number of access requests during the limit cycle may be incorporated to eliminate an unfair problem between substations. The throughput can be improved because of no access request failure under the contention.

The foregoing and other objects, advantages, manner of operation and novel features of the present invention will be understood from the following detailed description when read in conjunction with the accompanying drawings.

BRIEF DESCRIPTION OF THE DRAWINGS

FIG. 16 is a list showing the relationship between reception status types and transmission contents.

FIG. 17 is a list showing the relationship between fragment attribute types and transmission contents.

FIG. 18 is a list showing the relationship between reply types and transmission patterns.

FIG. 19 is a list showing the relationship between reply results and retransmission control.

FIG. 26 is a block diagram showing the transmitting unit of a radio frequency module according to another embodiment of the present invention.

DESCRIPTION OF THE PREFERRED EMBODIMENTS

Figure 1:
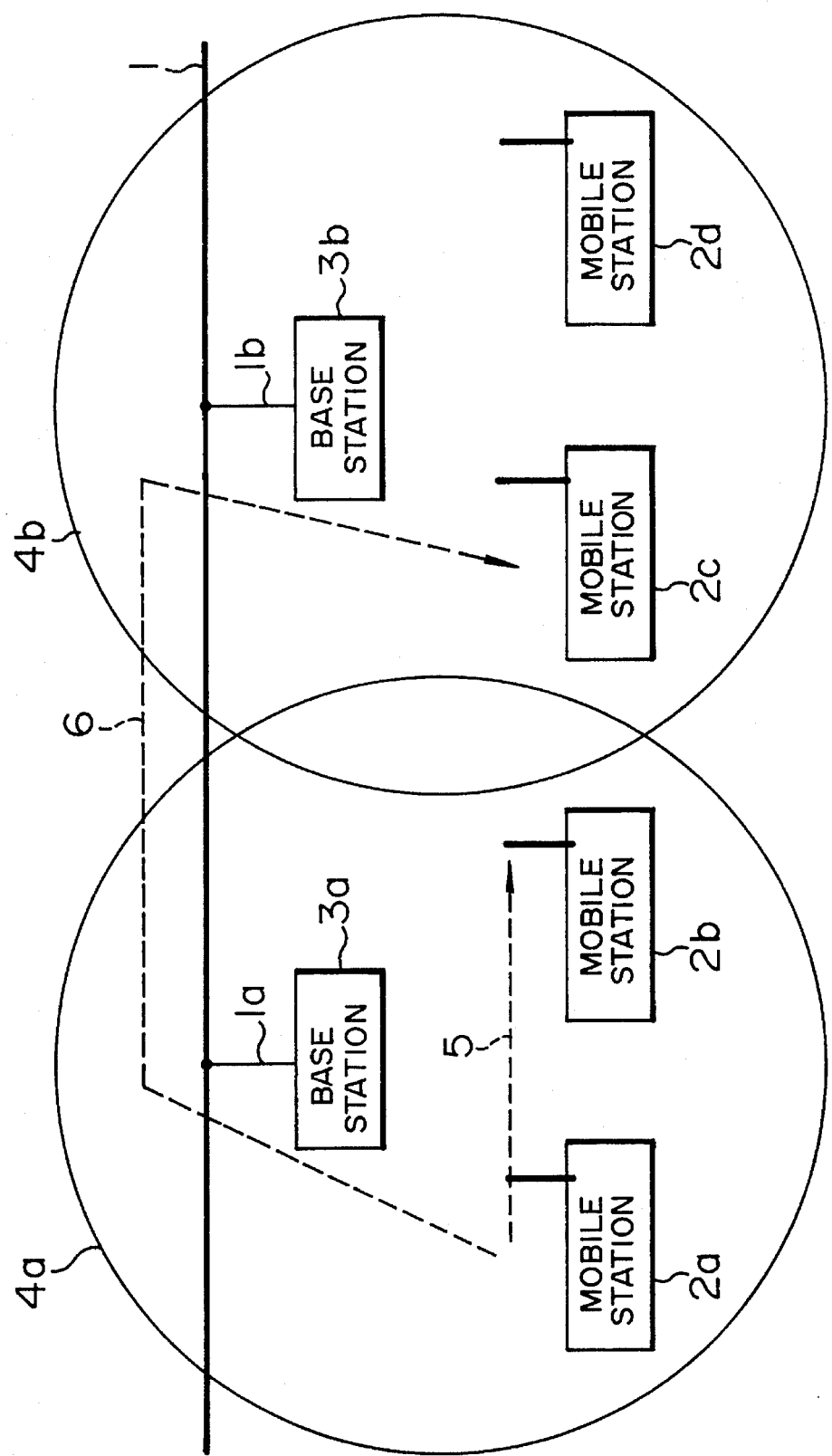
FIG. 1 shows an example of a network structure of a communication system according to an embodiment of the present invention.

FIG. 1 shows an example of the overall structure of a communication system according to an embodiment of the present invention.

This embodiment is applied to a wireless LAN by way of example. The communication method of the present invention, however, does not depend on whether a transmission path is a wired path or a wireless path. For example, a bus type network system may also be used wherein in place of wireless or mobile stations 2 (2a to 2a to 2d), a plurality of stations are wired to a backbone network 1.

In the network shown in FIG. 1, main or base stations 3a and 3b are connected via coaxial cables 1a and 1b to the backbone network 1. Reference numerals 4a and 4b represent management cells of the base stations 3a and 3b. The base station 3a and mobile substations 2a and 2b in the cell 4a as well as the base station 3b and mobile stations 2c and 2d in the cell 4b perform intracell communications at a frequency specific to each cell.

Communication between mobile stations in the same cell, e.g., between mobile stations 2a and 2b, is basically performed using a direct information transmission path indicated by a broken line 5. Communication between mobile stations in different cells, e.g., mobile stations 2a and 2c (intercell communication), is performed via a path 6 formed by the base stations 3a and 3b and backbone network 1.

Figure 2:
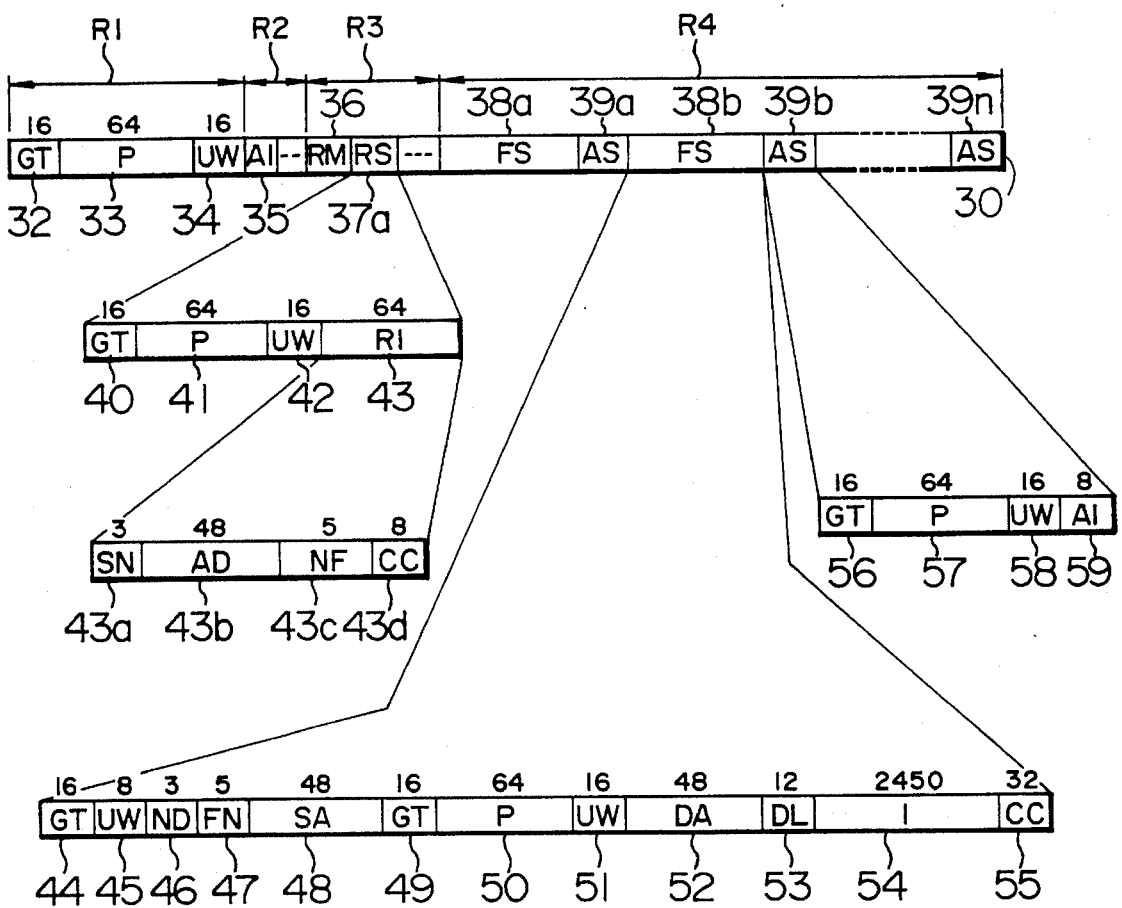
FIG. 2 is a diagram showing the structure of a frame and fragment used on radio links according to a first embodiment of the present invention.

FIG. 2 shows an example of the structure of a communication frame used for the communications between radio links of the communication system shown in FIG. 1.

The communication frame 30 has a frame synchronization field R1, a reply field R2, a request field R3, and an information field R4. Each base station supplies information to the frame synchronization field R1 and reply field R2. Each mobile station issues an access request by using the request field R3. The information field R4 is supplied with access permission information from a base station, information from a source mobile station, and reply information from a destination mobile station. The timing of sending each communication frame is determined by a base station.

The frame synchronization field R1 has a guard time (GT) field 32, a preamble (P) 33, and a unique word (UW) 34. The guard time field 32 is used to absorb a shift of timings between mobile stations caused by a difference between transmission distances from the base station. The preamble 33 is set with a fixed pattern "1, 0, 1, 0, 1, ..." representing information of a maximum clock timing. The unique word 34 is set with a fixed pattern indicating the header position of the reply field R2.

The request field R3 has a request mode (RM) field 36 and a plurality of request slots (RS) 37a, .... The RM field 36 indicates the conditions of an access enabled mobile station by using RS 37, the details of which will be described later with respect to FIG. 11.

The request slot RS 37i has a guard time (GT) field 40 like GT 32, a preamble (P) 41, a request information (RI) setting field 43, and a unique word (UW) 42. The guard time field 40 is used to absorb a shift of timings between mobile stations. The preamble 33 is used for the synchronization with a source station and a base station. The request information setting field 43 is set with an access request to a fragment field to be described later. The unique word 42 is used for indicating the header position of RI field.

Each RI field 43 has a sequence number (SN) field 43a set with a sequence number of an access request represented by modulo 8, a source address field (AD) 43b set with an address of a source station which issued the access request, a field (NF) 43c set with the number of fragments necessary for the source station to transmit one message, and a field (CC) 43d set with an error correction code for the request information set at SN field 43a to NF field 43c.

The reply field R2 is set with reply information regarding an access right request issued from a mobile station at a communication frame one frame before the communication frame in concern, the reply information being an ACK pattern and a NAK pattern, and depending upon the reply method used, a rejection (RJT) pattern to be later described. The reply field R2 has a plurality of reply slots (AI) 35a to 35m so as to correspond to respective request slots RS 37 of the preceding communication frame. Each RS of the request field R3 is in one-to-one correspondence with each AI of the reply field R2.

The information field R4 has a plurality of fragment slots (FS) 38a to 38n and a plurality of reply slots 39a to 39n paired with the fragment slots FS.

The contents of the frame fields starting from the guard time field GT 32 to request mode field RM 44 are set by a base station. The contents of each fragment slot (FS) 38, to be described later, starting from a guard time field (GT) 44 to destination address (SA) 49 are also set by a base station.

Each mobile station in a cell derives a standard clock of a base station from a pattern of the preamble (P) 33 at the header of a communication frame transmitted from the base station, by using a phase locked loop (PLL), and synchronizes its own clock with the base station clock. Each mobile station starts counting the clocks upon detection of UW 34 to thereby detect each field and each boundary between slots. The details of the fragment slot (FS) 38 and reply slot 39 will be later described.

Figures 3, 4:
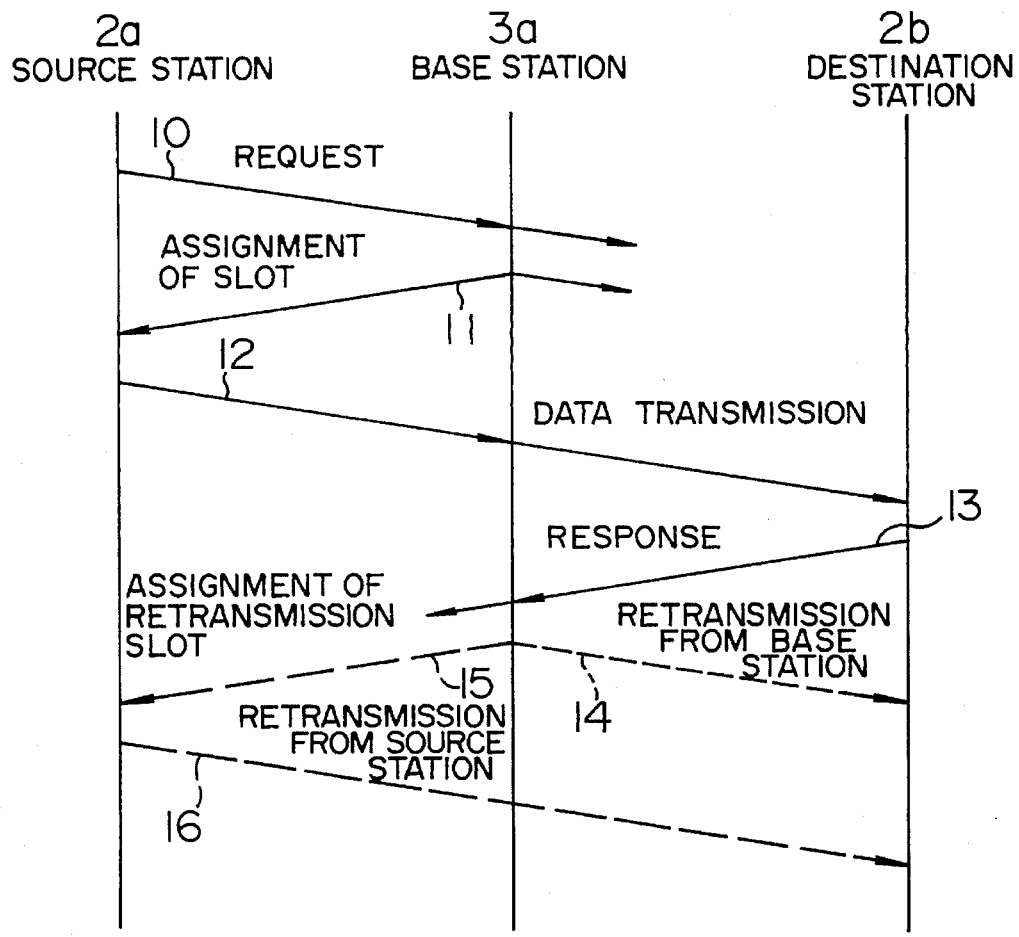
FIG. 3 is a diagram showing the communication procedure for intracell communication between a mobile station (substation) and a base station (control station).
FIG. 4 is a list showing reception reply operations in the communication procedure.

FIG. 3 shows the communication procedure when two mobile stations in the same cell communicate with each other (intracell communication) in the communication system of the present invention.

In this example, it is assumed that the mobile station 2a (source station) issues an access request and transmits data to the mobile station 2b (destination station).

During the period of the request field R3 of the communication frame, the source station 2a requests a fragment slot access right to transmit a message, and sets access request information to an optional request slot 37i (request transmission step 10). The request information contains the source address (AD) 43b and the number (NF) 43c of fragments necessary for the message transmission.

The base station 3a manages SN 43a of respective request slots for each mobile station, and temporarily stores (registration process) received information of the request slots in the request field R3 while discarding duplicated registration of an access request generated when a source station fails in receiving reply information AI to be later described. During the period of the next information field R4, the base station returns as access permission information the address of the source station capable of using the fragments, by using the source address field 48 defined at the header of the respective fragment slots 38 (slot assignment notice step 11).

The source terminal 2a checks the address received at the source address field of each fragment slot. If the source terminal 2a detects its own address, it judges, in the case other than the base station retransmission process to be later described, that an access to the fragment slot was permitted. The source terminal 2a outputs the address of the destination station 2b to the destination address (DA) field 52 defined at the header of the fragment slot, and outputs data to the following information (I) field 54 of a fixed length (data transmission step 12). This data is thereafter subjected to the reception process at the base station 3a and the destination station 2b indicated by the destination address 52.

The destination station 2b outputs reply information representing a success/failure of data reception to the reply slot (AS) 39i following the fragment slot (FS) 38i set with the data (reply step 13). If this reply indicates a reception success (ACK), the transmission procedure regarding the associated fragment is normally completed. The base station repeats the notice step 11 for assigning the next fragment slot 38i+ 1 to the source station in the same manner as described above.

If the reply 13 indicates a failure (NAK) of data reception at the destination station 2b, the data is retransmitted in the following manner.

If the data failed to be received at the destination station 2b was received correctly at the base station, the base station instead of the source station performs the data retransmission operation (base station retransmission step 14). This data retransmission operation can be realized by outputting from the base station the header information and data already received at the previous fragment slot 38i to the next fragment slot 38i+ 1.

If the data failed to be received at the destination station 2b was also failed to be received at the base station, the base station assigns the next fragment slot 38i+ 1 to the source station. In this case, control information indicating to retransmit data from the source station is set to a portion (ND field 46) of the header of the fragment slot 38i+ 1 (retransmission slot step 15).

When the source station receives the fragment slot 38i+ 1 containing the address of the source station at the source address field (SA) 48, the source station 2b retransmits (source station retransmission step 16) the data block previously transmitted if the header portion ND field 46 indicates a retransmission from the source station, and if the ND field contains information indicating a retransmission from the base station, it stands by to wait for the next fragment slot.

The base station retransmission step 14 or source station retransmission step 16 is repeated until the destination station succeeds in receiving the data or until the number of retransmissions reaches a number predetermined by the communication system.

FIG. 4 is a list of reception reply operations at a base station and a destination station.

If the destination station succeeds in a data reception, the transfer of the associated fragment is terminated irrespective of the reception success/failure 14' and 16' at the base station. A reception success at a destination station means an ACK reply of the reply slot 39i in the case of individual communication between mobile stations, and means a non-reply in the case of broadcast communication.

If the destination station fails in a reception and the base station succeeds in a reception, it corresponds to the base station retransmission 14, and if the base station also fails in a reception, it corresponds to the source station retransmission 16. A reception failure at a destination station means a NAK reply or a reply error in the reply slot 39i, or a non-reply at individual communication. The non-reply may be defined as a reply success in order to integrate the reply procedures of the individual and broadcast communications.

Figure 5:
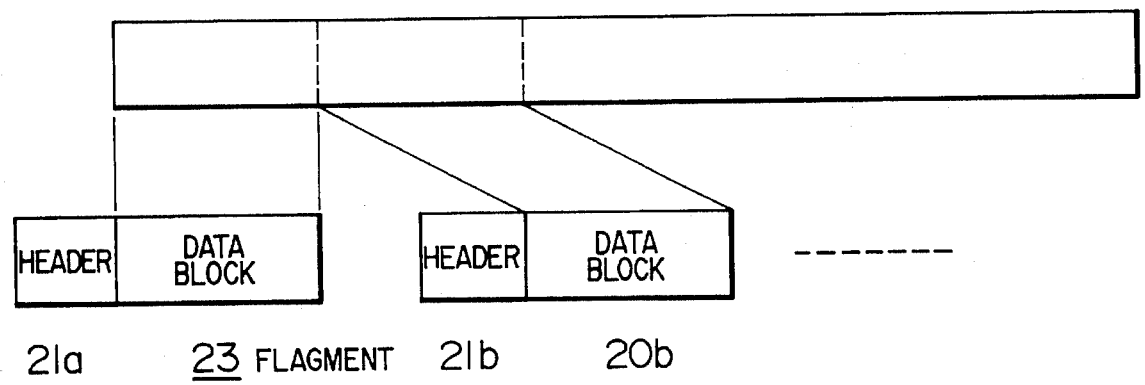
FIG. 5 shows the relationship between a message and fragments to be transmitted by a mobile station.

FIG. 5 shows the relationship between a message 20 to be transmitted from a source station and a part of the message (hereinafter called fragment) to be outputted to one fragment slot 38i.

The message 20 is divided into a plurality of data blocks 20 (20a, 20b, . . . ) of a fixed length. Each divided data block 20 and a preceding header 21 (21a, 21b, . . . ) constitute one fragment 23.

In a wireless LAN station, the upper frame 20 is generally an LLC frame defined by an interface between the LLC layer and MAC layer. In a wireless multimedia station, each fragment may be assigned at the period of 125 μsec for example.

Examples of a method of requesting a fragment slot applicable to the communication system of the present invention are as follows.

In a first method, each substation selects randomly one slot 37j of each frame from a plurality of slots (RS) 37a to 37m of the request field R3, outputs request information to this slot 37j. If the request collides with a request from another substation, a request is again issued to the request field of the next communication field.

In a second method, each substation outputs request information to a particular slot determined by the address of the substation each time a new transmission request occurs. If the request collides with a request from another substation, the second and subsequent requests are outputted to request fields of succeeding communication frames by randomly selecting the slots in the manner like the first method. This second method has an advantage of a priority control based on the address of a substation, but its control is somewhat complicated as compared to the first method.

In a third method, if a request collides with a request from another substation on the same slot, a request is again issued after the lapse of an optional time. As compared to the first and second methods, this third method has an advantage that throughput lowers less under a high load operation, although it has a disadvantage of an undesired access wait time under a low load operation.

If a plurality of substations issue requests at the same time relative to the same request slot RS 37, a code error of data in RS may be generated because of a collision between requests, resulting in substations failed in the request. In a practical application, assuming that the transmitting power is the same for all substations, a request signal issued at a substation nearer to the base station is received at a high receiving power at the base station, whereas a request signal issued at a substation remoter from the base station is received at a low receiving power at the base station.

As a result, in the case of contention of request signals on the same request slot, there occurs the case wherein a request issued from a substation near the base station is correctly received without any code error. In such a case, the base station returns an ACK reply to a reply slot corresponding to the contended request slot in the next frame reply field.

Each substation issued a request checks the SA and DA fields of the fragment slot of each communication frame as well as the reply field. If an ACK reply is found set in the reply slot corresponding to the previous request slot in the next communication frame, it is judged that the previous access request was accepted. The substation waits for its address in the SA field of the fragment slot without issuing again the access request. As described previously, if any access request survives after the contention of access requests, there is a possibility that a failed substation operates erroneously relative to the ACK reply.

There are two methods of solving such problems. In a first method, the address of a substation whose access request was acknowledged is outputted as the ACK information to the reply field R2. In a second method, the transmitting power at each substation is controlled to make the receiving power at the base station constant. This transmitting power control can be realized, for example, by changing the transmitting power at each substation in accordance with the receiving power of a signal transmitted from the base station.

When comparing the two methods, the first method has an advantage that the power control is not necessary. However, since the access request success rate changes with the distance to the base station, an unfair assignment of a transmission right occurs and a suitable countermeasure against this is required.

Returning back to FIG. 2, the structure of the fragment slot 38 will be further described.

The guard time (GT) field 44 at the header of the fragment slot (FS) 38 is provided for switching between transmission and reception at each substation and for pulling in a synchronizing signal.

Each substation detects the position of a new information indication field (ND) 46 basing upon the detection time of the preceding unique word (UW) 45. ND 46 is used for discriminating whether the fragment slot is used for the transmission of new data from the substation (step 12 shown in FIG. 3), i.e., used for a new fragment, used for the base station retransmission 14, or used for the source station retransmission 16.

Reference numeral 47 represents a fragment number (FN) field set with the fragment number indicating the sequence number of the fragment slot among those fragment slots requested by the substation.

Reference numeral 48 represents a source address field (SA). This field indicates the substation having an access right to the fragment slot, and indicates the source address of a packet assuming that the fragment slot has a fixed length packet. Accordingly, a substation which detected its own address in the SA field 48 starts, if the ND 46 indicates the new fragment, the transmission procedure of the header information and data to the field 49 and following fields after the SA field 48.

GT 49 is a guard time field like GT 43, which is used for providing a time required for the switching operation from the transmission state to the reception state at the base station, and from the reception state to the transmission state at a substation having the address SA.

A source station transmits after GT 49 a preamble (P) 50 and a unique word (UW) 51, and then an address (DA) 52 of a destination station, followed by a data length (DL) 53 and a fragmented data (I) 54 of a fixed length. The data length (DL) 53 indicates the length of effective data in the information field 54. The message 20 shown in FIG. 5 corresponds to the information field 54, and the header 21 corresponds to the fields 44 to 53.

Figure 6:
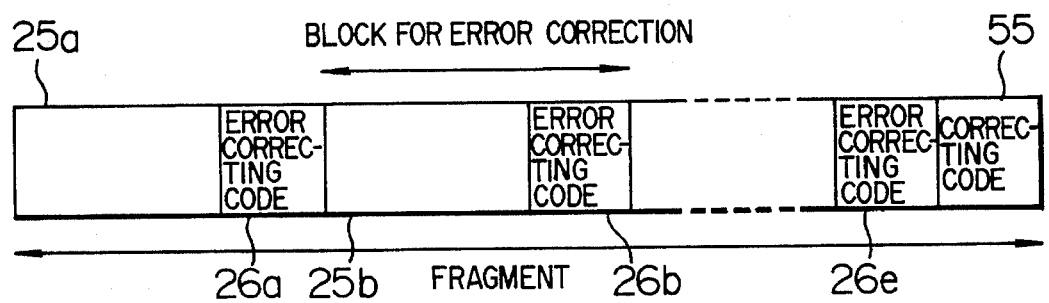
FIG. 6 shows the relationship between a fragment and a correction block.

The area from the DA field 52 to information field (I) 54 is omitted in FIG. 2. As shown in FIG. 6, this area is divided into subsidiary fields 25a to 25e of a 502 bytes unit for example. Each subsidiary field is added with an Hamming error correcting code 26a–26e of 9 bits. This area has five blocks for error correction each having a total length of 511 bytes.

The error detection for the area from DAA 52 to I 54 including the correcting codes is performed by an error detection BHC codes (CC) 55. Numerals added to the upper area of each field in FIG. 2 illustratively show the numbers of bytes.

A substation having the same address as that in the destination field (DA) 52 (a plurality of substations if DA 52 is a code indicating broadcast communication) outputs a code indicating the reception success/failure of the fragment (only the reception failure according to the reply method) to the reply slot (AS) 39.

The reply slot (AS) 39 is constituted by a guard time field (GT) 56, a preamble (P) 57, a unique word (UW) 58, and a reply information field (AI) 59. The reply code is outputted to the field 59. The reply method will be detailed later with reference to FIG. 12.

Figure 7:
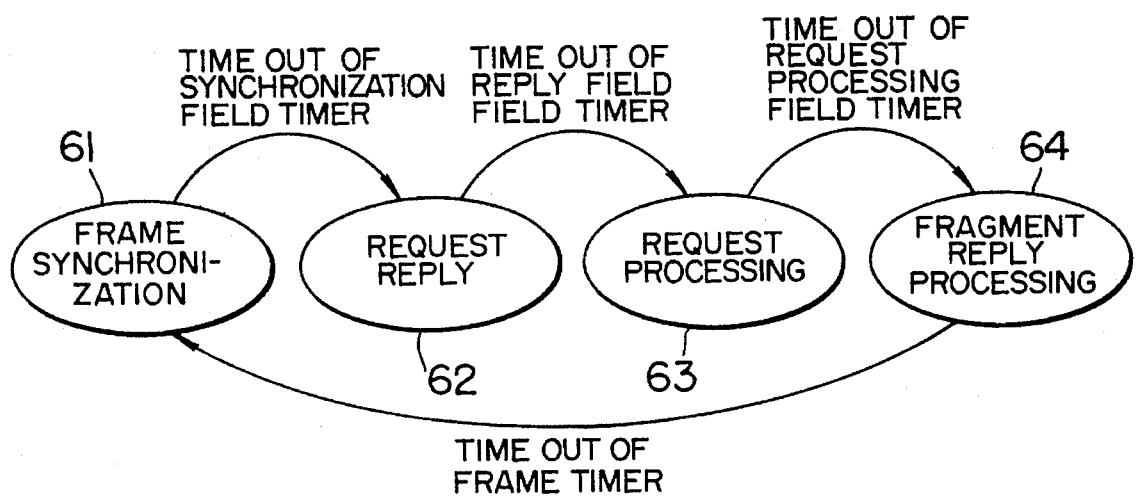
FIG. 7 is a state diagram explaining the timing control of a frame at a base station.

FIG. 7 is a state diagram explaining the frame timing control to be executed by a base station.

The operation states of a base station include a frame synchronizing state 61 outputting from GT 32 to UW 34 shown in FIG. 2, a request reply processing state 62 processing a plurality (e.g., four) of request reply information (AI) 35, a request processing state 63 processing the request mode (RM) 36 and a plurality (e.g., four) of request slots (RS) 37, and a fragment reply processing state 64 processing a plurality (e.g., four) of fragment slots (FS) 38 and reply information (AS) 39.

The transition between these states is effected upon timeout of each timer provided for each field (R1 to R4) of the communication frame. For example, assuming that the frame length is about 2000 bits and the transmission speed is 2M bps, then the maximum value of the frame timer is about 6 msec.

Figure 8:
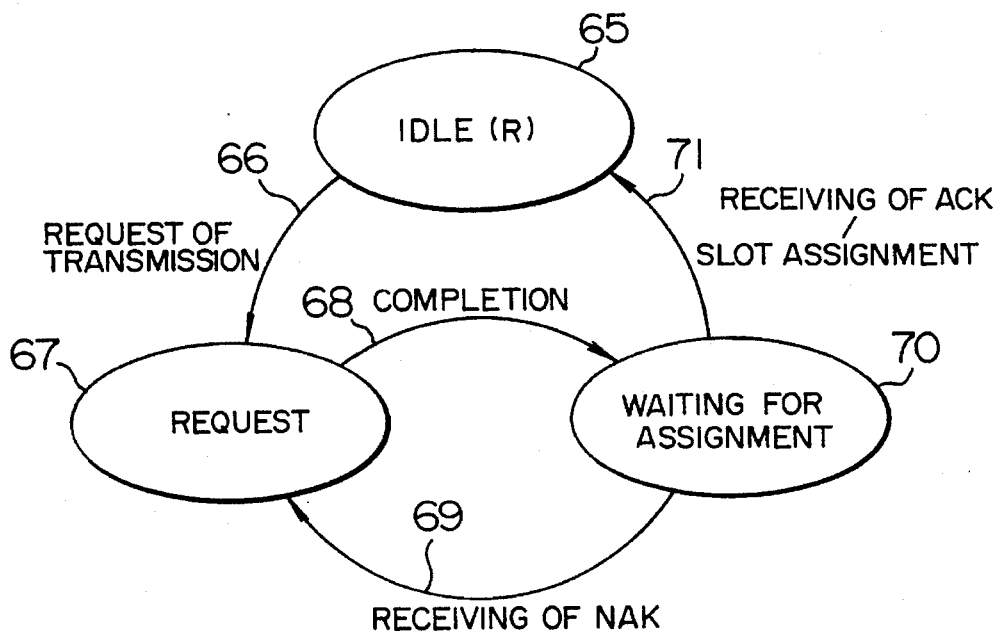
FIG. 8 is a state diagram explaining the request operation at a mobile station.

FIG. 8 is a request state diagram explaining the states at each substation in the case where a base station is in the request reply state 62 or in the request processing state 63.

Each substation is usually in an idle (R) state 65, and transits (transition 66) to a slot requesting state 67 when a message transmission request occurs, to request an access right to the base station by using the request slot. After the completion of transmitting the access request, the state transits (transition 68) to an assignment wait state 70 waiting for an assignment of the request by the base station.

If one of the fragment slots of the same frame by which the access request was issued, or if the request reply information slot (AI) corresponding to the request slot in the next frame indicates an ACK reply, the substation judges a request success to transit (transition 71) to the idle (R) state 65. In the case of a NAK reply, the state transits (transition 69) to the slot requesting state 67 to again issue an access request.

Figure 9:
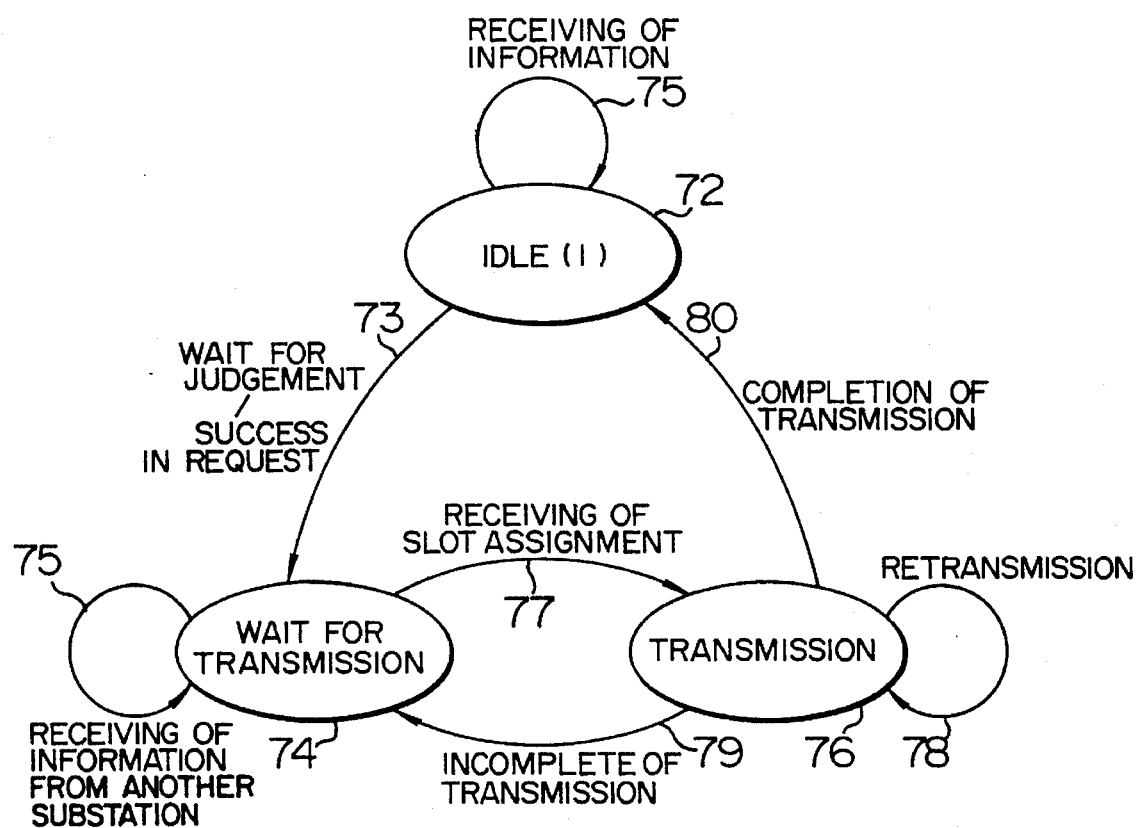
FIG. 9 is a state diagram explaining the transmission operation at a mobile station.

FIG. 9 is a state diagram explaining the states at each substation in the case wherein a base station is in the fragment reply processing state 64.

Each substation is usually in an idle (I) state 72, and transits (transition 74) to a transmission wait state 74 in the case of the assignment wait state in FIG. 8 or in the success request state 73.

In the idle (I) state 72 or the transmission wait state 74, there is a possibility of information reception 75 from another substation. In this case, the necessary reply process is executed and thereafter the original state is resumed. If a fragment slot assigned by the base station is received as indicated at 77 in the transmission wait state 74, the state transits to transmission 76.

If transmitting the fragment using the slot fails, the retransmission 78 is repeated. After the completion 80 of transmitting the success fragment, the state returns to the idle state (I) 72. If an assignment is waited for or a success fragment transmission is incomplete, the transmission state 76 transits to a transmission wait state 74 to wait for an assignment of a new fragment slot.

Figure 10:
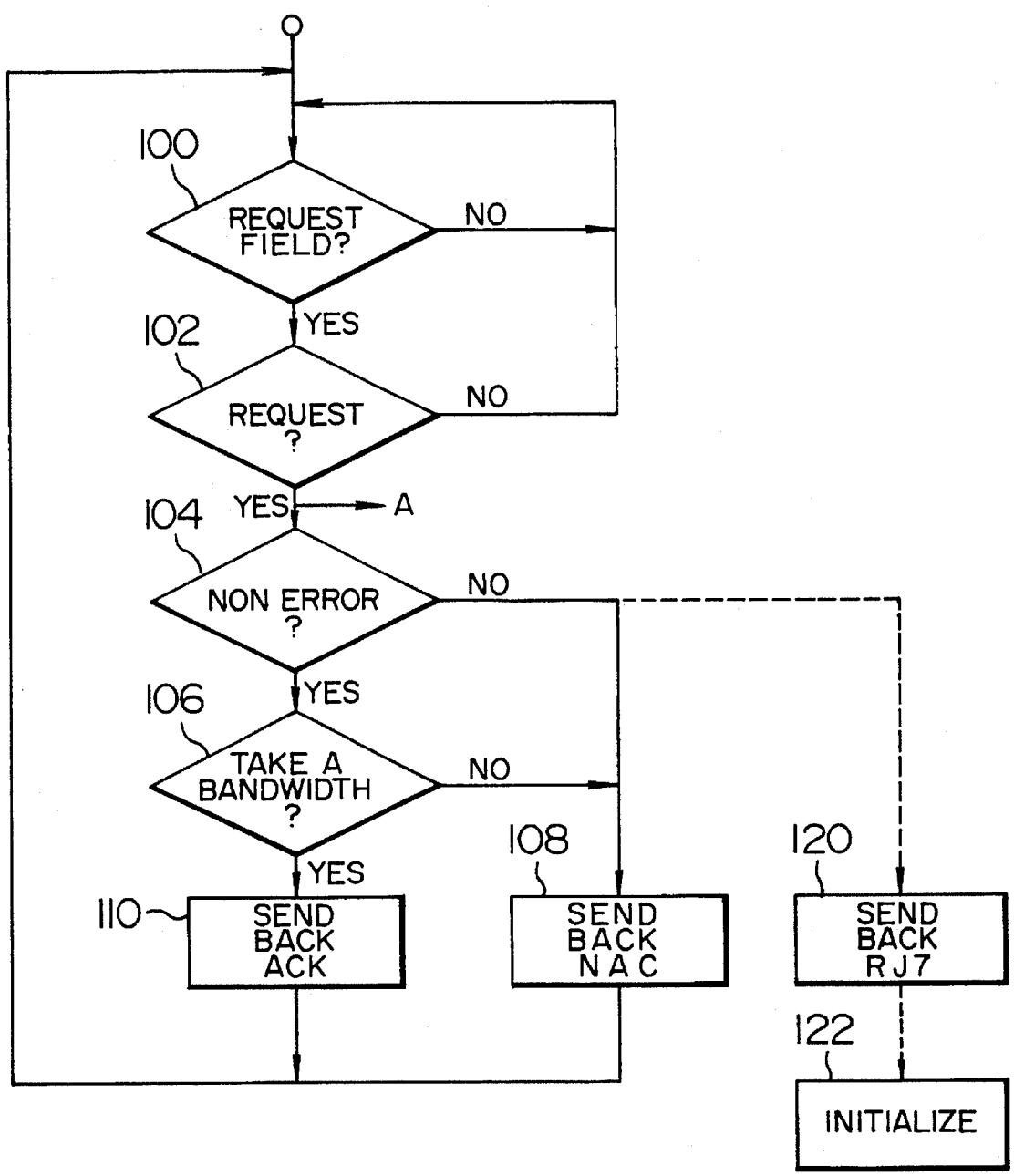
FIG. 10 is a flow chart illustrating the procedure of a request reception judgement at a base station.

FIG. 10 illustrates a reception and judgment procedure, to be executed by a base station, of an access right request in the request processing state 63 and in the request reply processing state 64.

The base station judges whether it is a reception time of the request field R3 in a communication frame 30 (step 100). If it is the reception time, it is checked whether there is an access request (request information) from a substation (step 102).

If there is request information, a data error if any in the request slot (RS) is checked using the error detecting code (CC) 43d (step 104).

If the request information is correctly received, the total number of fragments already received and in the transmission wait state is referenced to check, if the new access request is permitted, whether the new fragments (transmission bandwidth) can be reserved (step 106). If they can be reserved, an ACK reply is sent back (step 110).

In the case where there is an uncorrectable bit error in the request information, an abnormality of the sequence number (SN) 43a is detected, or the bandwidth cannot be ensured if the new request is permitted, a preparatory process is executed for sending back a NAK reply to the request reply field (R2) 35 of the next communication frame.

In the case of the abnormality of the sequence number (SN) 43a such as a skipped or duplicated number request, it is assumed that the system is abnormal. Upon occurrence of the abnormal state of the system, instead of the ACK/NAK pattern, a reject (RJT) pattern may be sent back (step 120). When the RJT reply is sent back, the base station initializes the control of the abnormal substation in the cell (step 122). The substation which received the RJT reply initializes the substation control.

Figure 11:
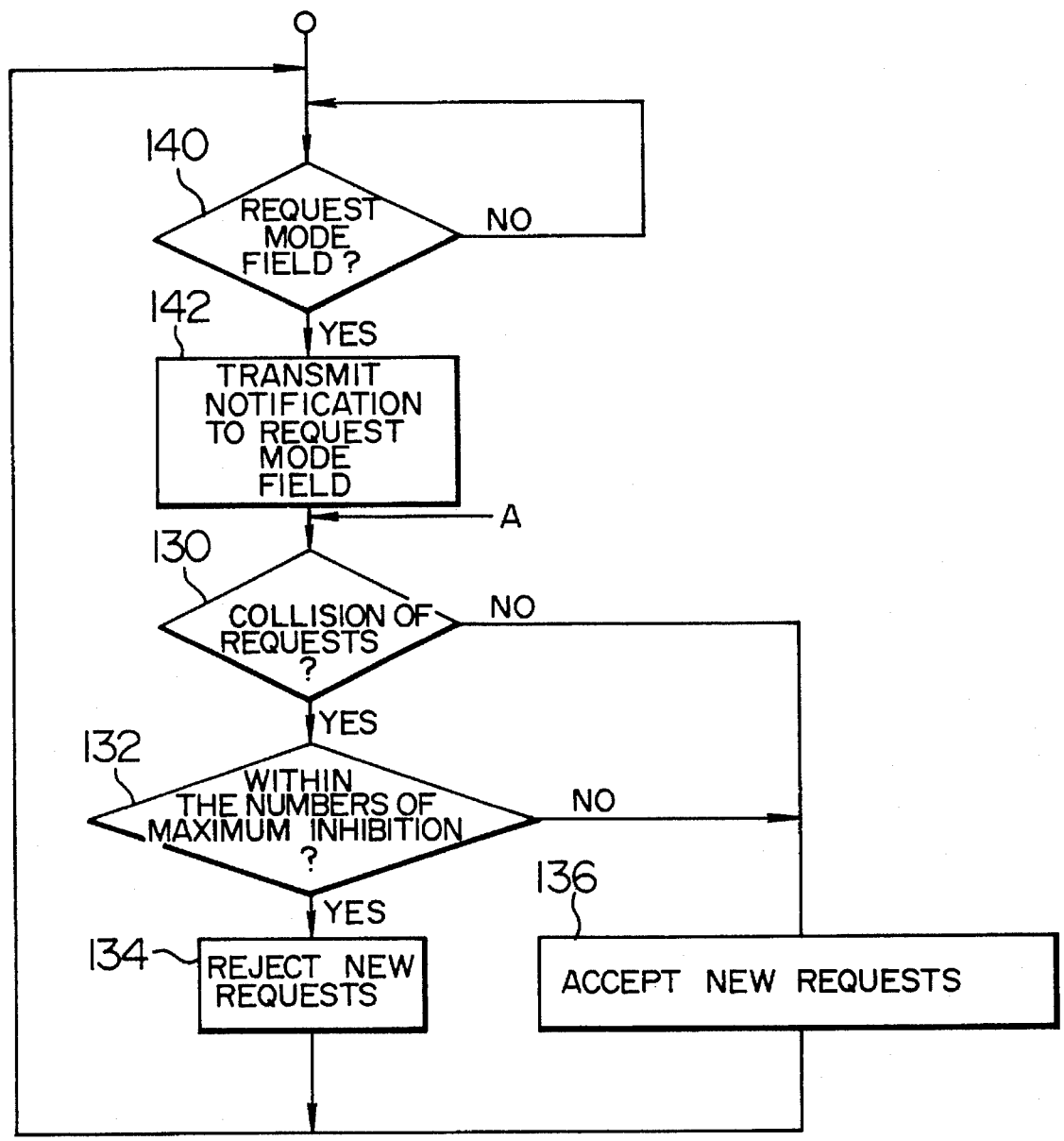
FIG. 11 is a flow chart illustrating the procedure of an access control at a base station.

FIG. 11 illustrates an access control procedure to be executed by a base station regarding the request field R3.

In this control, using the request mode (RM) field 36 shown in FIG. 2, the base station notifies a new access rejection (step 134) or new access acceptance (step 136). The new access rejection means that when a collision is detected at one of the slots in the request field (step 130), a substation other than collided substations is informed that a new access is rejected at the request field of the next communication frame. However, if the number of consecutive communication frames in the access request rejection mode exceeds a predetermined number (step 132), the access request rejection mode is released at the following communication frame (step 136).

In this embodiment, a new access from another substation is rejected until the collision (contention) of access requests is removed before the number of consecutive request rejection modes reaches the predetermined number. In a system having the number of slots RS 36 in the request field R3 smaller than an average number of request occurrences, a threshold value of the number of slots RS in the collided state may be set to perform the following control. Namely, when the number of slots RS in an actual collision state exceeds the threshold value, a new access request is rejected, and when it becomes smaller than the threshold value, the rejection is released.

When a new access rejection (step 134) or an acceptance of a new access (step 136) is determined, at the request mode field R3 of the next communication frame (step 140), notice information is outputted to the RM field 36 (step 142).

Figure 12:
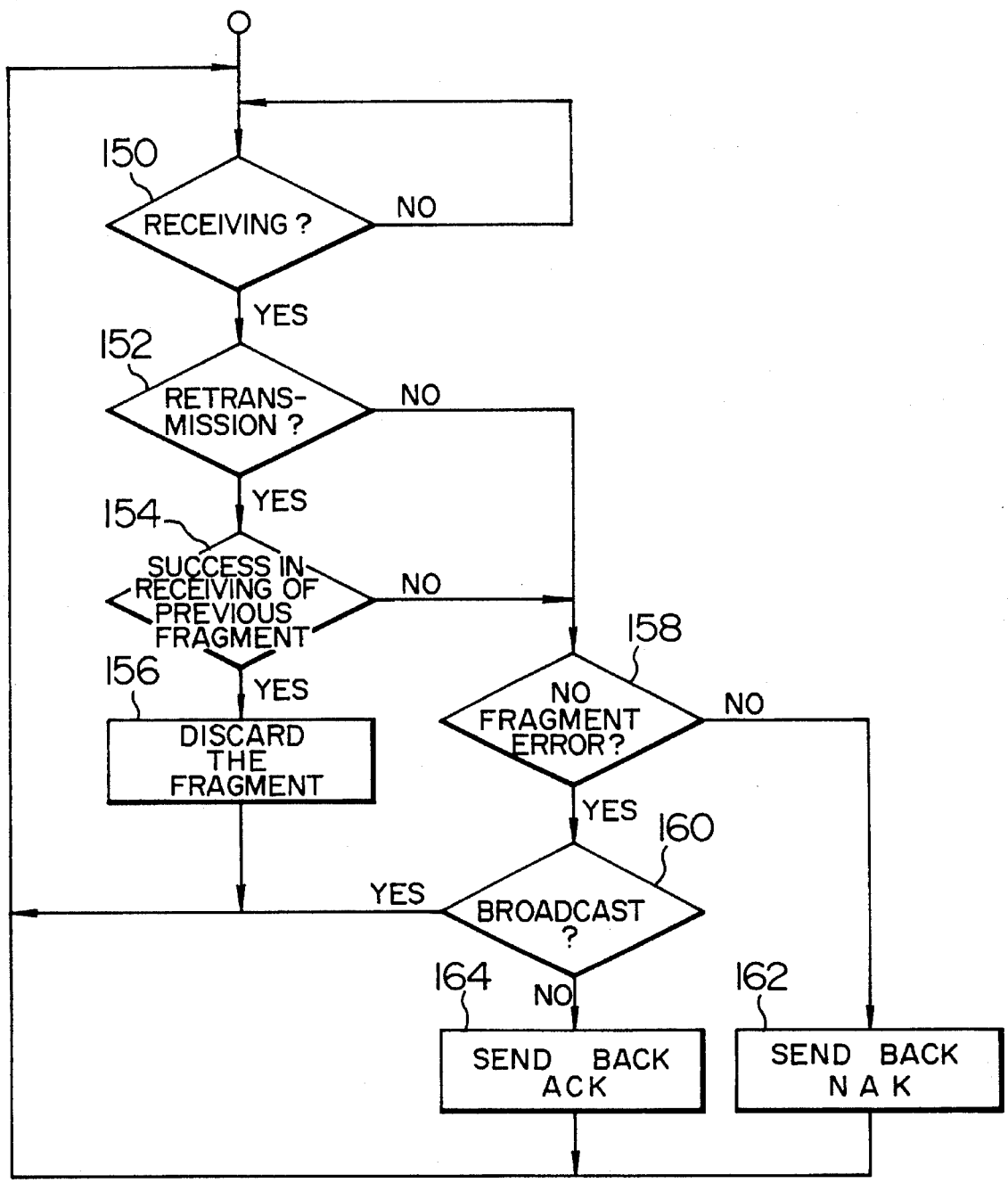
FIG. 12 is a flow chart illustrating a reception operation at a mobile station.

FIG. 12 illustrates the procedure to be executed by a substation when a fragment is received.

When the address of a substation or the special address representing broadcast communication is received at the substation in the destination address field (DA) 52 (step 150), it is judged from the contents of the already received new information indication field (ND) 46 whether the fragment contains retransmission data (step 152).

If the fragment has been used for retransmission, it is checked whether the fragment just before the fragment in concern has been successfully received (step 154). If successfully received, it is judged that the ACK reply outputted to the reply field (ASD) for the previous fragment was not received normally by the base station, and that the already received fragment was erroneously retransmitted from the substation. Accordingly, the current received fragment is discarded (step 156).

If the current received fragment is judged as a new one from the judgement of the ND field (step 152: N), or if it is judged as the retransmitted fragment responded to the NAK reply for the previous fragment (step 154: N), then it is checked whether any error is present in the contents of the fragment (step 158). If an uncorrectable error is detected, a NAK reply is sent back to the reply slot (ASD) 39i following the fragment 38i (step 162).

If the received fragment is normal, this fragment is subjected to the reception process to transfer it to the upper layer. In this embodiment, the reply operation when a normal fragment is received changes with whether the fragment is for the broadcast communication or for the individual communication.

In the case of the individual communication, an ACK reply is outputted to the reply slot 39i (step 164).

In the case of the broadcast communication (step 160: Y), in order for the ACK replies from a plurality of substations not to collide on the reply slot (AS) 39i and avoid a reply failure, a reply pattern is not sent back to the reply slot 39i. Specifically, in this embodiment, the success/failure of reception is positively notified in the case of the individual communication, and in the case of the broadcast communication, a reply is sent back only when the reception failed.

If a reply is sent back only when a reception was failed in the individual communication, there is a fear that the source station erroneously judges that the reception succeeded if there is no reply because for example the destination station is in a hidden terminal.

Figure 13:
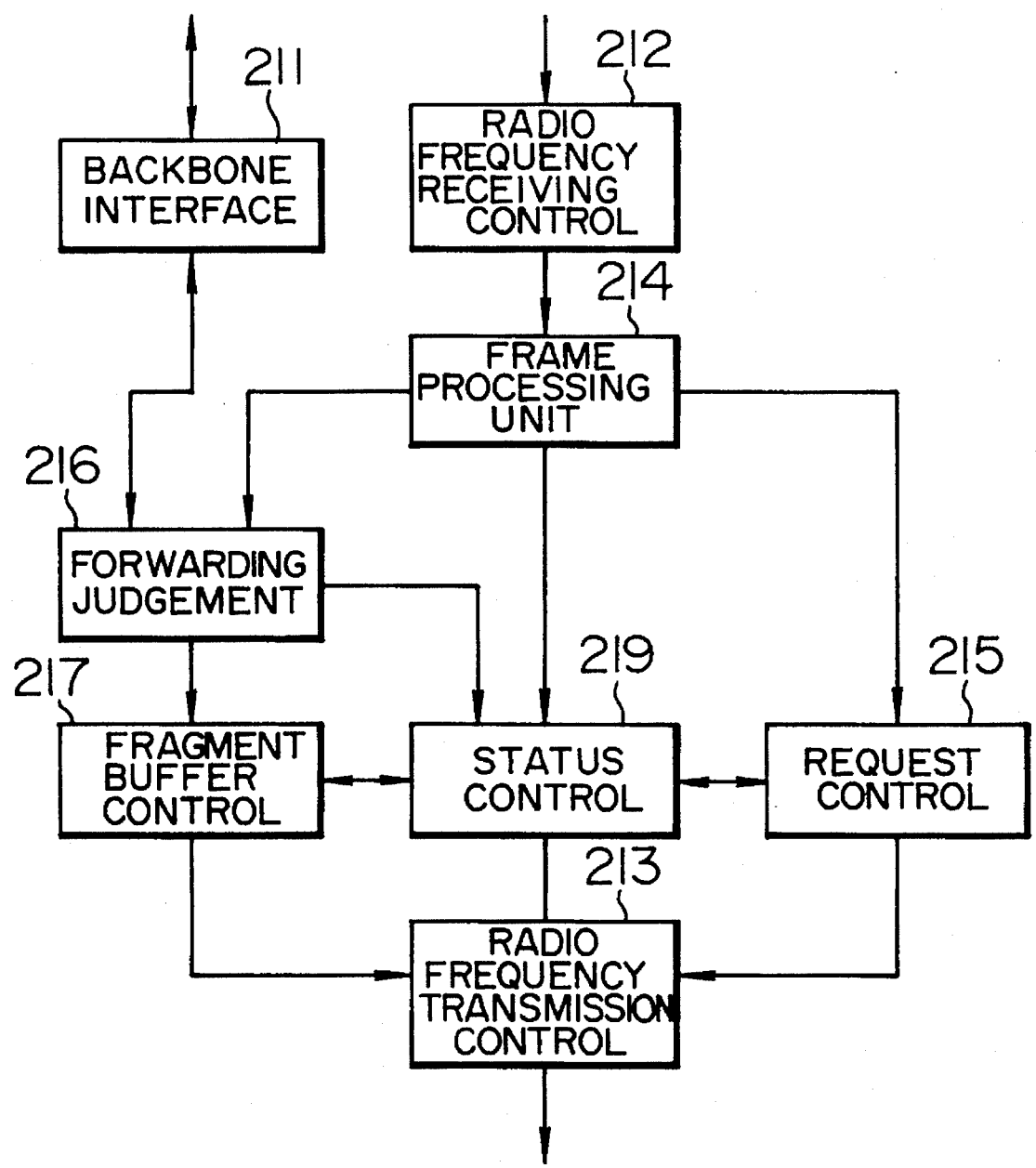
FIG. 13 is a block diagram showing the fundamental structure of a base station.

FIG. 13 is a block diagram showing the fundamental structure of a base station which executes the above-described access control.

A base station is connected to a wired LAN 1 to connect another base station via a backbone interface 211. The base station is also connected to mobile stations by wireless channels via a radio frequency reception control circuit 212 and a radio frequency transmission control circuit 213.

A frame processing unit 214 generates a basic timing for each communication frame, and recognizes each field of a communication frame to derive information from each field in accordance with the information in the preamble and unique word fields received by the reception control circuit 212 and outputted from a mobile station. The information of the request field R3 derived from the communication frame is transferred to a request control unit 215, and the information of each fragment slot 38 and reply slot 39 in the information field R4 is transferred to a forwarding judge unit 216.

The request control unit 215 judges whether or not a request should be accepted, as described with FIG. 10, and sends back an ACK or NAK reply. Depending upon the reply method, the radio frequency transmission control circuit 213 is instructed to send back an RJT pattern. If an access request is received from a mobile station, the request is queued.

The forwarding judge unit 216 refers to a control table in accordance with the destination address of the fragment inputted from the backbone interface 211 to judge whether the fragment is forwarded to the cell supervised by the base station. The fragment judged to be forwarded is stored in a fragment buffer control unit 217.

The forwarding judge unit 216 is also supplied with a fragment from the frame processing unit 214 outputted from a mobile station. The fragment judged to be forwarded is also stored in the fragment buffer control unit 217. If an abnormal fragment is received and a NAK reply is received from a mobile station, the forwarding judge unit 216 notifies a status control unit 219 of such effect.

The status control unit 219 issues an output request of an indication signal of retransmission by the source station to the radio frequency transmission control circuit 213 synchronously with the timing of the fragment slot supplied from the frame processing unit 214.

The fragment buffer control unit 217 responds to a control signal from the status control unit 219 and instructs the radio frequency transmission control circuit 213 to transmit (or retransmit) the fragment in the buffer for forwarding a fragment from another cell and for retransmission by the base station.

Figure 14:
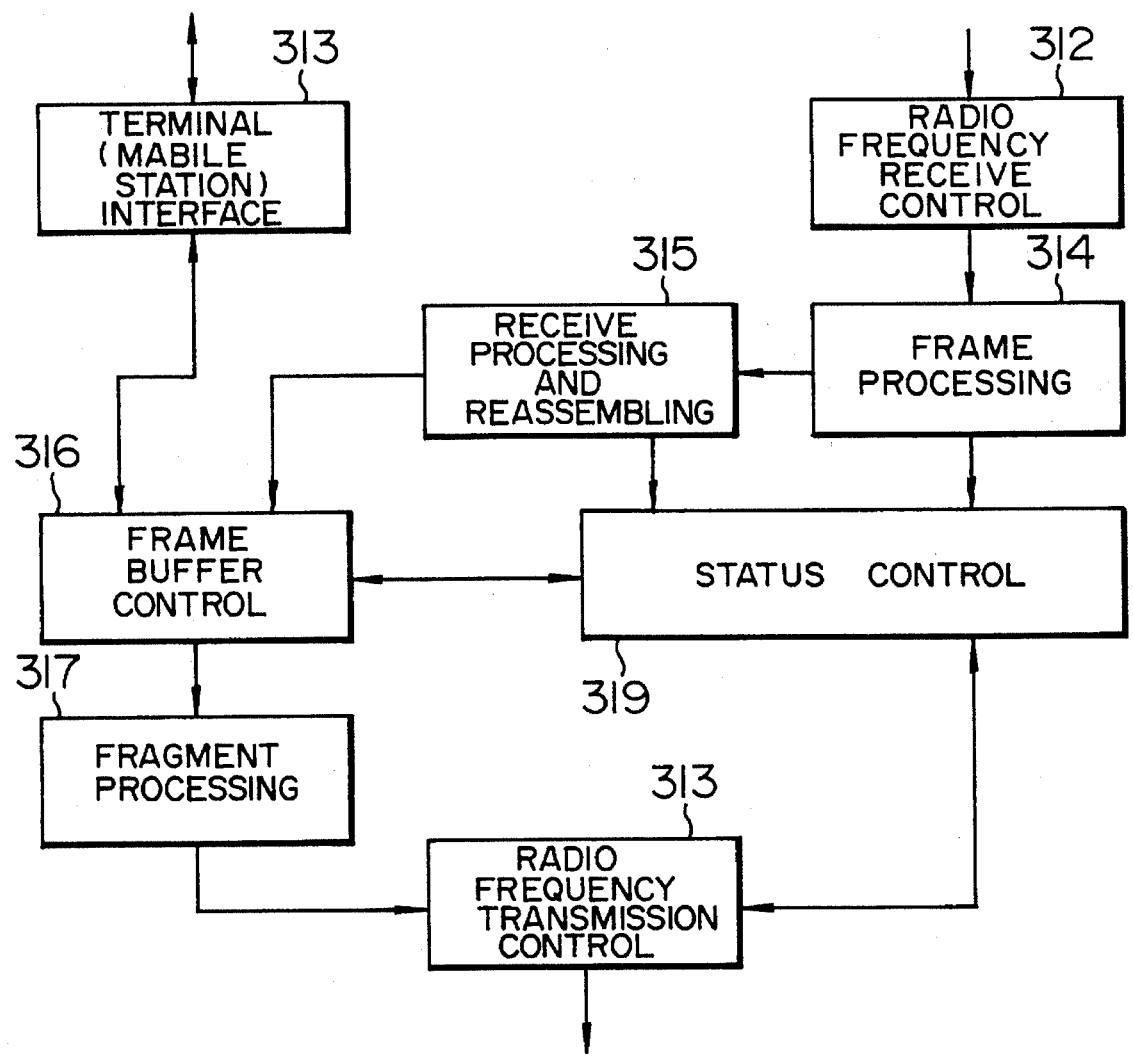
FIG. 14 is a block diagram showing the fundamental structure of a wireless communication unit of a substation.

FIG. 14 is a block diagram showing the fundamental structure of a communication unit equipped with each mobile station.

Reference numeral 311 represents an interface for the connection of the mobile station to a circuit unit constituting the upper layer. The control command and message received from the upper layer are temporarily stored in a frame buffer control unit 316.

The message stored in the frame buffer control unit 316 is segmented into a plurality of data blocks each having a fixed length. The data block to be transmitted is supplied to a fragment processing unit 317 in response to a transmission command from a status control unit 319 to be assembled as a fragment with a header such as described with FIG. 5. This assembled fragment is transmitted from a radio frequency transmission control circuit 313.

Under the poor communication environment of frequent occurrences of retransmission wherein it is difficult to recover an original message in all the blocks of one fragment for error correction by using error correcting codes, in response to an instruction from the status control unit 319, data is transmitted in a redundant transmission mode by using the same contents of a plurality of blocks on the fragment for error correction as the data blocks.

Whether or not the contents of the fragment indicates the redundant transmission mode is notified to the destination station by setting a mode discrimination flag to the new information indication field (ND) 46 of the fragment.

At the destination station, the fragment received by the radio frequency reception control circuit 312 is inputted via the frame processing unit 314 to a receive processing and reassembling unit 315. If a reception success is obtained at one block for error correction, the reception of the fragment is judged as a success even if there are uncorrectable blocks.

In this embodiment, the reception success/failure of blocks for error correction is determined by using the error correcting and detecting codes in the blocks. The reception success/failure may be determined on a decision-by-majority basis of blocks. Blocks for error correction may be classified into a plurality of groups in each fragment to execute the redundant transmission mode in units of each group.

The communication frame from a base station or another mobile station received at the radio frequency reception control circuit 312 is frame-synchronized by the frame processing unit 314 to derive the contents of each field. The derived fragment slot is supplied to the receive processing and reassembling unit 315, and other information is supplied to a status control unit 319.

The receive processing and reassembling unit 315 performs the reception process shown in FIG. 12 for each received fragment. The reception success fragment is reassembled to a message which is in turn stored in a frame buffer control unit 316. The stored message is transmitted to the higher level layer via a terminal (mobile station) interface. The status control unit 319 controls to perform an access right assignment request operation or other operations in response to a control command from the frame buffer controller 316.

In this embodiment, each mobile station requesting data transmission informs the base station of the necessary number of fragments and its address by using the received request frame. The base station schedules the received request and transmits the mobile station address used for indicating an access permission at the output timing of the header of each fragment slot in the same frame. The mobile station having the same address as the received address transmits thereafter the destination address and message to the field after the fragment slot in concern.

With this access control, it is possible for the base station to dynamically assign the fragment slot in response to an access request. It is also possible for mobile stations to directly perform transmission and reception. Accordingly, the access delay time vs. traffic load characteristics become almost the ideal characteristics M/D/l.

Transmitted information is received by both the base station and destination station. If the source station sends back a reply indicating a reception failure, the base station detects the reply to automatically retransmit the fragment at the next fragment slot.

This retransmission operation can be performed also by the source station. In this connection, however, a base station of a wireless LAN in particular has generally a better transmission function and an installation site with less communication trouble than a mobile station. Therefore, by the embodiment method wherein a base station is assigned a retransmission operation, a very high possibility can be expected that a source station failed in receiving data from a source station correctly receives the data retransmitted from the base station.

Furthermore, new information to be transmitted, reply, and retransmission can be transmitted sequentially. Accordingly, the retransmission control can be realized with a small capacity buffer and a simple buffer management.

The second embodiment of the present invention will be described, aiming at dissolving the unfair problem at mobile stations to be caused when a contention of access requests occurs in the wireless LAN shown in FIG. 1, and aiming at improving the throughput.

In the following description, a communication system will described by way of example which uses narrow band modulation by setting the occupied bandwidth to a bandwidth in the order of the information transmission rate. Other schema such as a direct sequence spread spectrum scheme and a frequency hopping spread spectrum scheme may also be used. With the former scheme, a message signal is transmitted by multiplying it by a spread code, and with the latter scheme, a narrow band modulation carrier is changed with time and a spread code.

In the case of the narrow band modulation, a frequency division multiple access method is used which changes the carrier frequency at each cell. In the case of the direct sequence spread spectrum scheme, a frequency is changed at each cell or a spread code sequence is change at each cell, and in the case of the frequency hopping spread spectrum scheme, the spread code sequence is changed at each cell. The access control method of the present invention to be described below is applicable to all of these modulation schema.

Each modulation scheme has been described in many documents in detail, such as "Digitization Technology for Mobile Communication", p. 76 by TRICEPS, and so the details of it is omitted in this specification.

Figure 15:
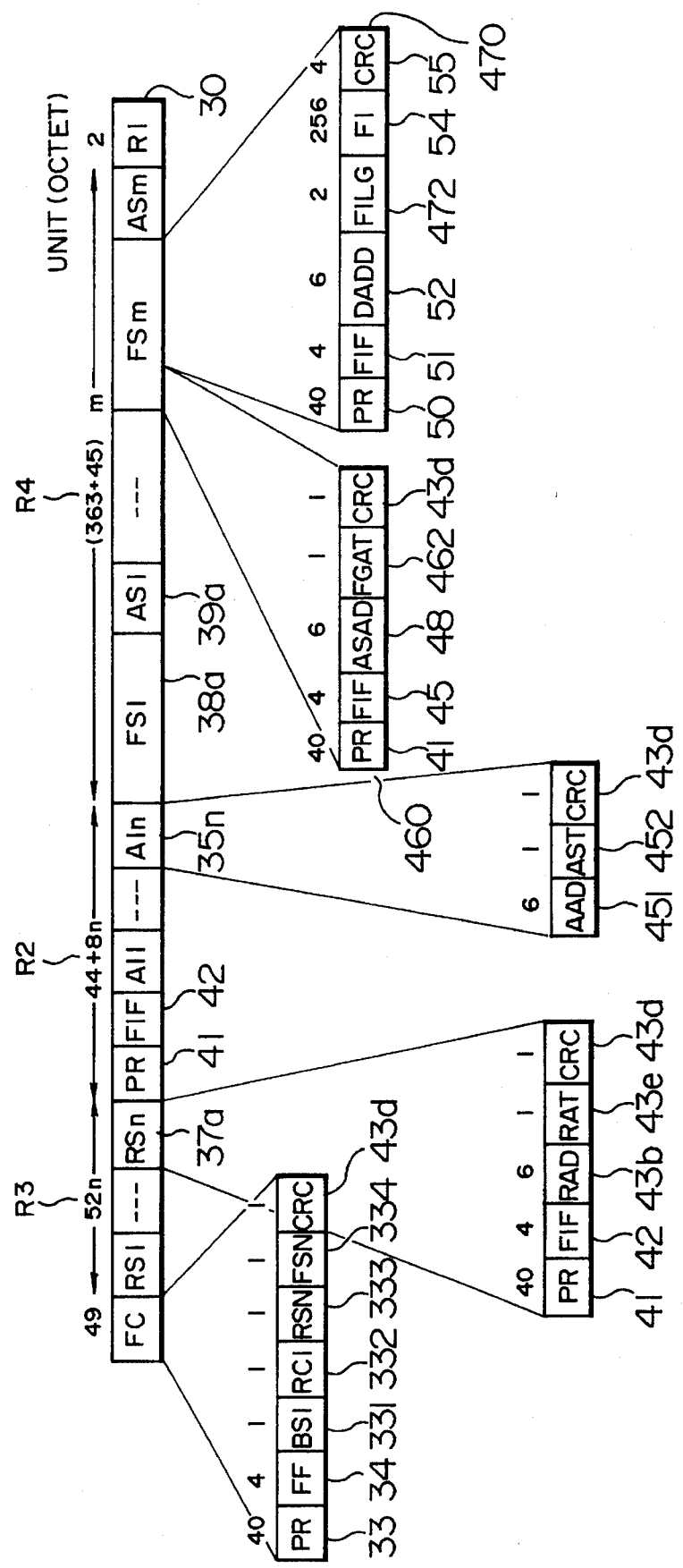
FIG. 15 shows the structure of a communication frame used on radio links according to a second embodiment of the present invention.

FIG. 15 shows a communication frame 30 used for data transmission to radio links according to the second embodiment.

The communication frame 30 includes a frame control field FC, a request field R3 having a plurality of request slot fields RSi (i= 1 to n), a reply field R2 having a plurality of reply slot fields AI (i= 1 to n), a message field R4, and a request indication field RI. The message field R4 has a plurality of fragment slot fields FSj (j= 1 to m) and a plurality of corresponding fragment reply fields ASj (j= 1 to m). The timing of the communication frame is determined by a base station.

The frame control field FC is transmitted from a base station, and includes a preamble (PR) 33, a frame flag (FF) 34 as a unique word, and other frame control information.

The preamble 33 is used for establishing bit synchronization at each mobile station. For example, the preamble has a length of 40 octets and uses a specific bit pattern "10101010 10101010, . . . , 10101010".

The frame flag 34 is used for establishing frame synchronization and octet synchronization at each mobile station and has a length of 40 octets for example. For example, a frame flag pattern "10101011 10101011, . . . , 10101011" is used.

The frame control information has a length of 5 octets, and includes a base station identifier (BSI) field 331, a request cycle identifier (RCI) field 332, a request slot number (RSN) field 333 indicating the number of request slots in the request slot field, and a fragment slot number (FSN) field 334 indicating the number of fragment slots in the frame.

The request cycle identifier (RCI) is used for detecting a renewal of a limit period (cycle) provided for preventing the same mobile station from exclusively gaining the transmission right. In this embodiment, the request cycle identifier 332 indicates a numeral which is incremented at each communication frame. Each mobile station judges that the request cycle has been renewed if RCI takes an initial value of "00000000" or if an RCI not expected from the already received RCI is received due to abnormality of CRC 43d, and resets a counter (request counter) prepared for limiting the number of access requests during each request cycle. When RSN or FSN which caused CRC abnormality is received, the already received latest numeral without CRC abnormality is used.

The request field R3 has n request slots RS1 to RSn.

Each mobile station having a message to be transmitted selects an optional one of the request slots RS1 to RSn, and issues an access request per one message.

In this embodiment, if the request is failed due to a collision of another request, the mobile station outputs a reservation indication for a transmission right to the request indication field (RI) at the end of the communication frame in order to notify the base station of a reservation of an access request right (transmission right) at the next communication frame. A mobile station newly entering in the cell performs the above-described request operation to request an addition of the MAC address of the mobile station to a terminal database (registration database) of the base station.

Each request slot RS1 to RSn includes a preamble (PR) 41 of 40 octets length, a field flag (FIF) 42 of 4 octets length, and other slot information fields 43a to 43c of 8 octets length in total. The field flag 42 is set with "10101100 10101100, . . . , 10101100".

A mobile station issuing a request transmits the MAC address assigned thereto to the base station by using a request address field (RAD) 43b of 6 octets.

A request attribution field (RAT) 43e includes an attribute pattern of 2 bits and succeeding request information of 6 bits. The attribute pattern discriminates whether the request is for a fragment reservation request or for a request for reservation of an address to the registration database.

If the attribute pattern indicates the transmission right reservation request, the number of fragment slots reserved by the request is set as the request information. If the attribute pattern indicates the request for reservation of an address to the registration database, the identifier (BSI) of the base station at which the address is registered is set.

Any error of information in the request slot is detected by CRC 43d of 1 octet. An address of 6 octets conforming to IEEE 802 addressing may be used at the MAC address.

The request reply field R2 includes a preamble (PR) 41 of 40 octets length, a field flag (FIF) 42 of 4 octet length, and n request slot reply fields (AI1 to AIn) 35n each of 8 octets length.

A base station sets a reply to an access request from a mobile station, by using each request slot reply field AI1 to AIn corresponding to each request slot RS1 to RSn in the request field R3.

Each request slot reply field AIi includes an access address (AAD) field 451 of 6 octets for setting the contents of RAD 43b of the request slot, an access status (AST) field 452 of 1 octet for setting access status information representing a success/failure of the access request, and CRC 43d of 1 octet for checking an error of request slot reply information.

As shown in a table 520 of FIG. 16, the access status field is set with a bit pattern 520B corresponding to a reply type 520A. The reply type includes a request success (RACK) status 521, a request failure (RNAK) status 522, a request rejection (RRJC) status 523, and a non-request (NONR) status 524. In the table 520, a column 520C represents the contents (meaning) of each reply.

A mobile station judges as a request success if a CRC abnormality is detected at the reply information field AIi corresponding to the request slot RSi to which the access request was issued, and judges as a request failure if the reply information requests for the registration of the identifier of a base station.

If the request is judged as a success, the mobile station starts timer watching to watch the number of fragment slots at the message fields R4 of the following communication until the number of fragment slots reaches the requested number. If a time-out occurs, an access request is again issued.

Each fragment slot field (FS1 to FSm) 38a includes a fragment control field 460 of 52 octets length transmitted from the base station, and a fragment slot transmission field 470 of 311 octets length. The fragment slot transmission field 470 is supplied with a message by a mobile station designated by an address set in the fragment control field 460. Each communication frame has m fragment slot fields, and the number m is notified to each mobile station by using the FSN field 334 of the frame control field FC.

Each fragment control field 460 includes a preamble 41 of 40 octets length, a field flag 45 of 4 octets, and other control information fields of 8 octets in total.

The other control information fields include an assigned address (ASAD) field 48 of 6 octets length at which the MAC address of a mobile station gained the access right to fragment slot is set, a fragment attribution (FGAT) field 462 of 1 octet, and a CRC field 43d. The fragment attribution field (FGAT) is set with a bit pattern 530 shown in the table 530 of FIG. 17 corresponding to the attribute 530A, such as NFD, BRD, and SRD. The CRC field 43d is used for checking an error of the fragment control information field. The information in these fields is set by the base station. In the table 530, a column 630C represents the contents (meaning) of each fragment attribute notice.

The assigned address (ASAD) field 48 also supplies an indication of the address of a source station of fragment information to the base station.

The fragment slot transmission field 470 includes a preamble 50 of 40 octets length, a field flag 51 of 4 octets, and other information fields of 267 octets length.

The other information fields includes a destination address (DADD) field 52 of 6 octets length for setting the MAC address of a destination station of fragment information, a fragment information length (FILG) field 472 of 2 octet length for indicating the effective length (8 bits) of the succeeding fragment information (FI) field 54 in units of octet, a fragment information (FI) field 54, and a CRC field 55 of 4 octets length for checking an error of the fragment slot field 470. The information of these fields is set by the source station gained the access right.

The FILG field 472 includes two-bit position information (e.g., start block, intermediate block, end block) for indicating the position of the data block of the message set in the fragment information (FI) field 54, and a six-bit fragment (data block) sequence number.

Each fragment reply field (AS1 to ASm) includes a preamble of 40 octets length, and a one octet field. This one octet field is set with a reply bit pattern 540B or 540C shown in the table 540 of FIG. 18 indicating a reception success: ACK or reception failure: NAK. The reply bit pattern are predetermined for each communication type such as individual communication and broadcast communication. The information of these fields is supplied by a fragment destination station to notify the base station of the reception status of the fragment slot field.

As shown in the table 550 of FIG. 19, a base station performs a retransmission control predetermined for each reply supplied from the destination station. The details of the retransmission control are given in Table 4 and FIG. 12 of "Access Control Method for Wireless LANs", IEICE Technical Journal of Radio Communication System, RCS, 92-37, and so the descriptions thereof are omitted in this specification.

In this embodiment, since a plurality of mobile stations may collide on the fragment reply field during broadcast communications, each mobile station is restricted to send back only a NAK reply, and the base station detects the NAK reply basing upon a presence/absence of a carrier on the fragment reply field.

A request indication field (RI) at the end of each frame is set with a request indication pattern of 2 octets length. A request indication pattern is transmitted to this field (RI) by a mobile station having a message to be transmitted and the request counter whose value is smaller than a request window value. Such a mobile station will be called hereinafter an active mobile station. A request indication pattern is for example "00110011 00110011".

Since a plurality of mobile stations having a message to be transmitted will collide on this request indication field, the base station judges from a presence/absence of a carrier on this field whether this field was accessed by any mobile station. The base station which confirmed, from the state of the carrier on this field, that there is a mobile station having a message to be transmitted and the request counter whose value is smaller than the request window value, notifies each mobile station of the continuity of the same request cycle by using the next frame RCI 332 so long as the number of access requests falls within the request cycle limit.

Figure 20:
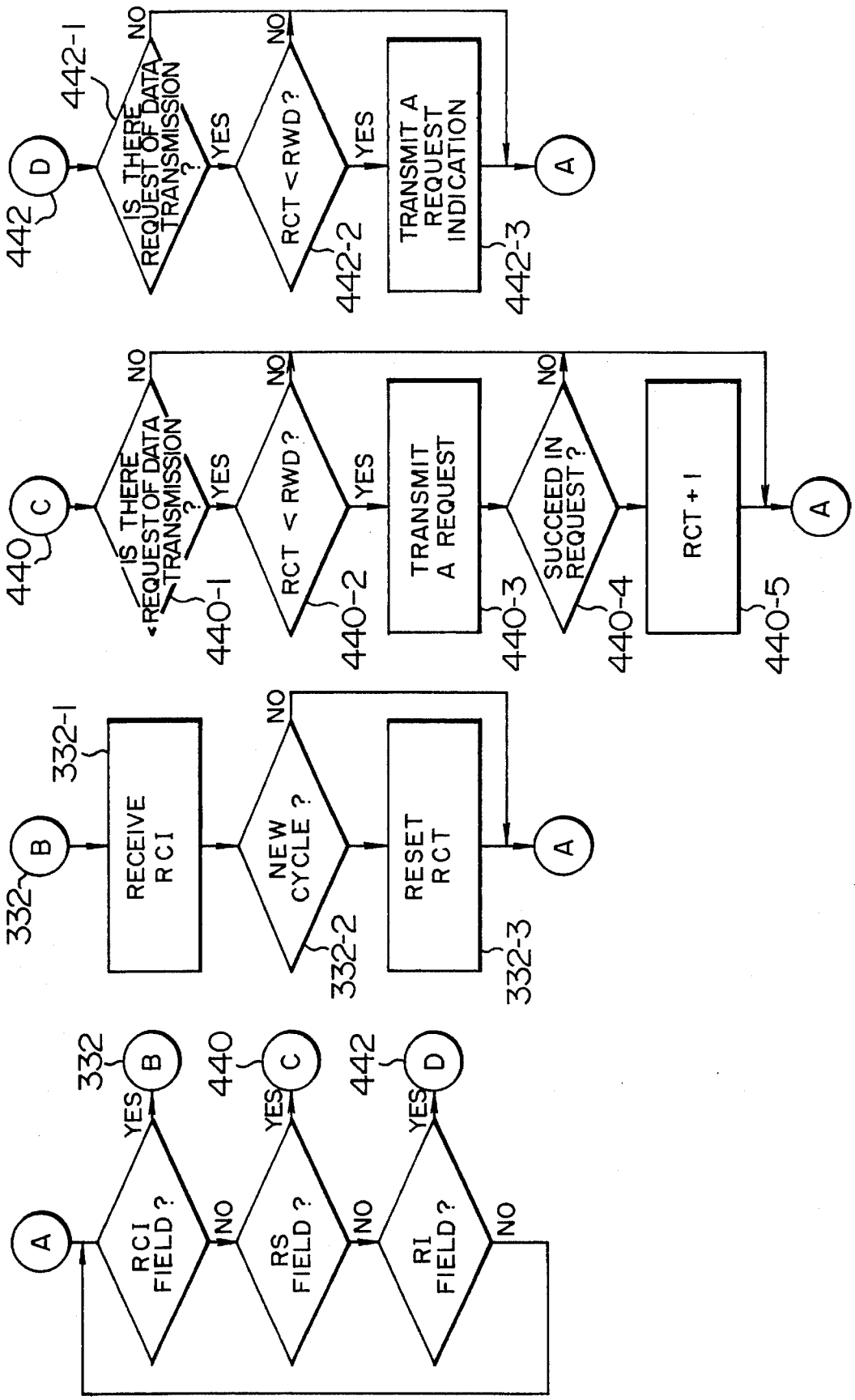
FIG. 20 is a flow chart illustrating the procedure for processing a request cycle at a mobile station.

FIG. 20 illustrates the request cycle procedure at each mobile station.

When a frame flag (FF) 34 transmitted from the base station is received, the mobile station detects each field in the frame using the frame flag as a detection reference and performs the following processes for respective fields.

At the RCI field 332, the request cycle identifier (RCI) is received (step 332-1). If RCI= "0", it is judged that the control entered a new request cycle (step 332-1) and the request counter (RCT) is reset.

At the request slot field (RS) R3, if there is a request for data transmission (step 440-1) at the mobile terminal, the value of the request counter (RCT) is compared with the request window value (RWD) (step 440-2).

If RCT< RWD (i.e., an active mobile station), an access request is transmitted to an optional slot RSj selected from n request slots RSi to RSn (step 440-3). Thereafter, it is checked from the reply slot AIj of the request reply field R2 corresponding to the slot RSj whether the request has succeeded (i.e., has reserved a transmission right) (step 440-4). If the request has succeeded, the request counter RCT is incremented by 1 (step 440-5).

At the request indication field (RI), it is checked whether there is a request for data transmission (step 442-1). If there is a request for data transmission and the mobile station is active (step 442-2), a request indication pattern is transmitted (442-3).

Figure 21:
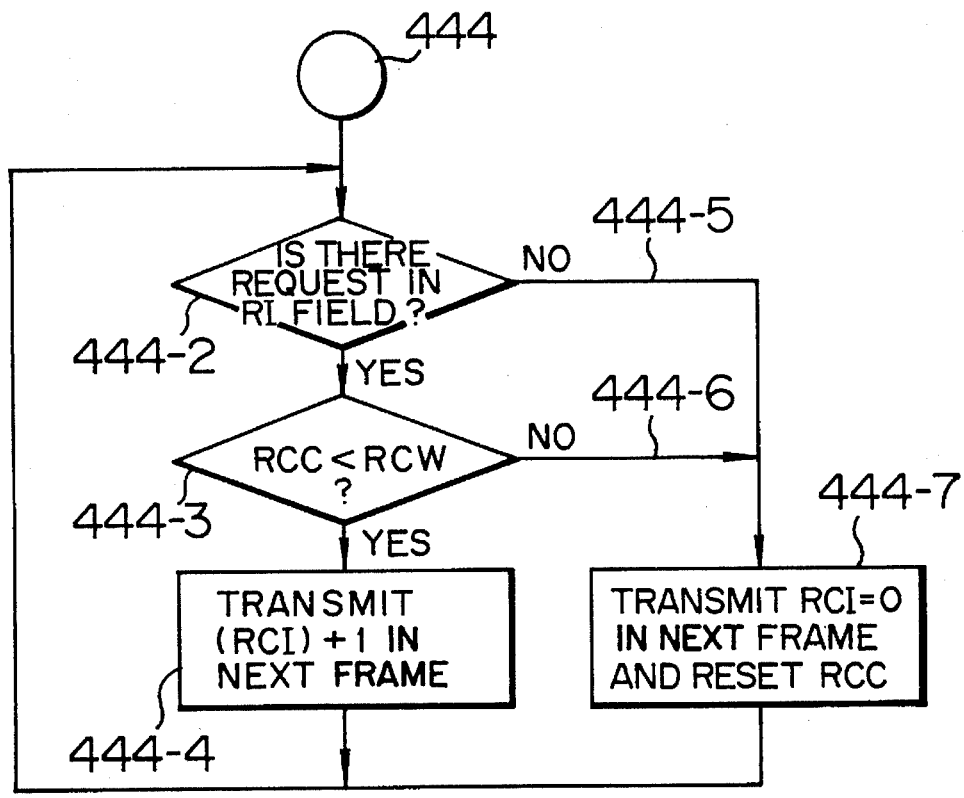
FIG. 21 is a flow chart illustrating the management procedure for a request cycle at a base station.

FIG. 21 illustrates the request cycle management procedure at a base station.

When a transmission request by a mobile station is detected at the request indication field RI (step 444-2), the base station compares the value of a request cycle counter (RCC) with a request cycle window value (RCW) (step 444-3). If RCC< RCW, the value of the request cycle identifier (RCI) 332 is incremented by 1 to obtain a new RCI value which is transmitted at the next frame RCI field 332 (step 444-4). In this manner, each mobile station is notified of a continuity of the same request cycle.

On the other hand, if a request (reservation) of data transmission from a mobile station is not detected at the request indication field RI (step 444-5), or if RCC= RCW (step 444-6), a value "0" is set to the next frame RCI field 332 and the value of the request cycle counter is reset (step 444-7).

In the second embodiment described above, the number of reservations is controlled by using a window to realize a fair access control in the split-channel reservation multiple access method. Next, a third embodiment of the present invention will be described wherein the slotted ALOPHA method is applied to the multiple access method of the type that each mobile station directly transmits data without reserving a transmission right.

Figure 22:
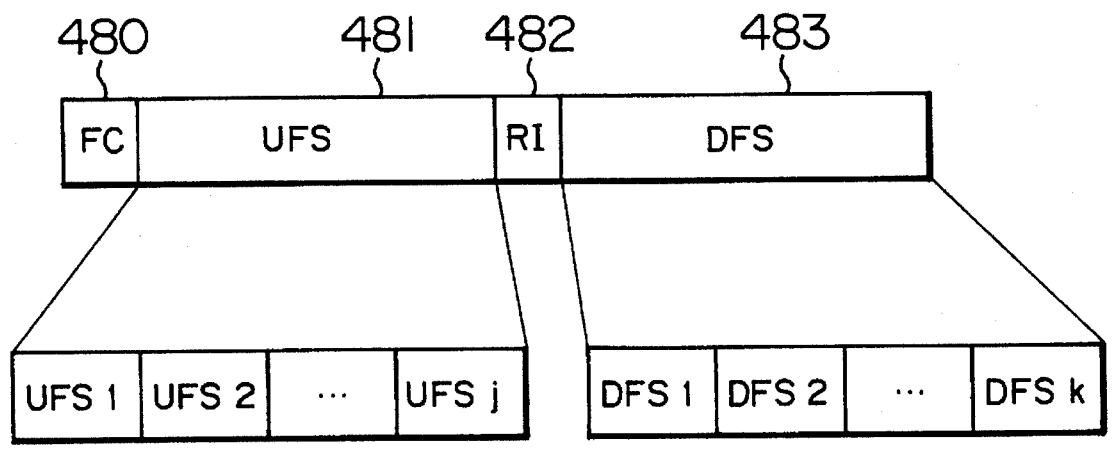
FIG. 22 shows the frame structure used by radio links according to a third embodiment of the present invention.

FIG. 22 shows the frame structure according to the third embodiment.

This frame includes a frame control field (FC) 480, an up-link fragment slot field (UFS) 481 to be used for the communication between a mobile station to a base station as a relay station, a request indication field (RI) 482, and a down-link fragment slot field (DFS) 483 for the communication between a base station and a destination station. The base station transmits the contents of the frame control field (FC) 480 to notify each mobile station of the frame timing.

The structure of the frame control field (FC) 480 is fundamentally the same as the second embodiment shown in FIG. 15. In the third embodiment, the number j of fragment slots in the UFS field 481 is set to the RSN field 334, and the number k of fragment slots in the DFS field 432 is set to the FSN field 334.

A mobile station (active mobile station) having a right to request data transmission at the next frame UFS performs a transmission operation at the request indication field (RI) 482, which is the same as the second embodiment. A base station controls the request cycle depending upon whether a mobile station has requested an address registration to RI.

The active mobile station having the value of the request counter smaller than the window value selects an optional one of the i-th to j-th fragment slots in the up-link fragment slot field (UFS), and directly transmits data to the selected slot independently from a access permission from the base station.

The maximum use factor of the UFS field assuming a collision (contention) of transmitted data from a plurality of mobile stations, is theoretically about 38%. Therefore, the number k of slots in the down-link fragment slot field (DFS) is set about 2.6 times as large as the number j of slots in the up-link fragment slot field (UFS).

Figure 23:
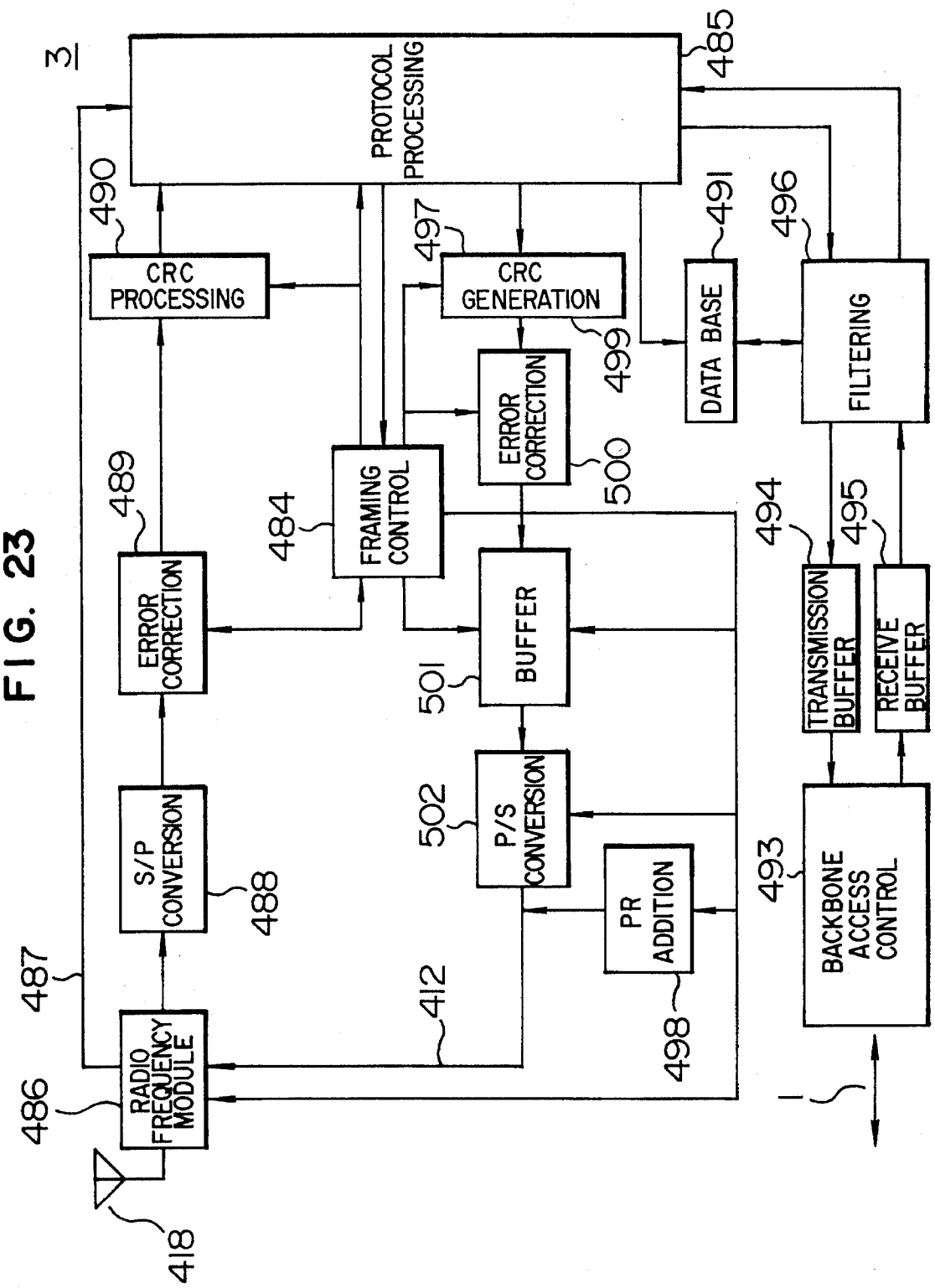
FIG. 23 is a block diagram showing the structure of a base station of the third embodiment.

FIG. 23 is a block diagram showing an example of the detailed structure of a base station. A different point from the second embodiment is the provision of the functions of a framing unit 484 and a protocol processing unit 485.

Reference numeral 486 represents a radio frequency module which performs a modulation/demodulation process of a baseband signal and a transmission/reception process at a high/middle frequency, and which supplies a carrier signal 487 detected from a received signal to the protocol processing unit (microprocessor). Reference numeral 488 represents a serial/parallel (S/P) converter for converting received serial data of one bit into parallel data of eight bits using a field flag (FIF) transmitted from a mobile station as a reference. Reference numeral 489 represents an error correcting circuit for correcting one bit error by using BCH correcting code. The corrected data is inputted to a CRC processing circuit 490 to detect an error in each field. The error detected results as well as received data is sent to a protocol processing unit 485.

The protocol processing unit performs an analysis of the contents of received data, a request cycle control, a transmission right reservation/assignment process, a transmission activation, a retransmission control, a transmission data generation, a relay data segmenting/reassembling control, a registration to a registration database (DB) 491, and other processes.

Reference numeral 493 represents a backbone network access processing circuit corresponding to the backbone interface 211 shown in FIG. 13, and performs an interface process to a backbone LAN 1 such as Ethernet and Token Ring. Data transferred to/from the backbone network is stored in a transmission buffer 494 and a receive buffer 495.

The registration database DB 491 stores management data such as MAC addresses of mobile stations in a cell covered by the base station. A filtering circuit 496 performs a filtering process of data to be transmitted to the backbone LAN and data received at the mobile station, in accordance with the management data stored in the registration database DB 491.

When data is to be transmitted from the base station to a mobile station, a transmission indication signal 497 is supplied from the protocol processing unit to the framing unit 484. Under the control of the control circuit 484, pattern information of a preamble generated by a preamble addition circuit 498 is first supplied to the radio frequency module 486. During this period, transmission data outputted from the protocol processing unit is supplied to the CRC generator 499 to generate an error correcting code. The CRC code is inserted in the transmission data at the error correcting circuit 500. These data are stored in the buffer 501.

The data stored in the buffer 501 is converted into parallel data by a parallel/serial (P/S) converter 502. The parallel data is supplied after the supply of the preamble to the radio frequency module 486 under the control of the framing unit 484, and transmitted therefrom into the air.

In this embodiment, for example, the protocol processing unit 485 is made of a 32-bit microprocessor, and other elements are formed by a custom IC.

Figure 24:
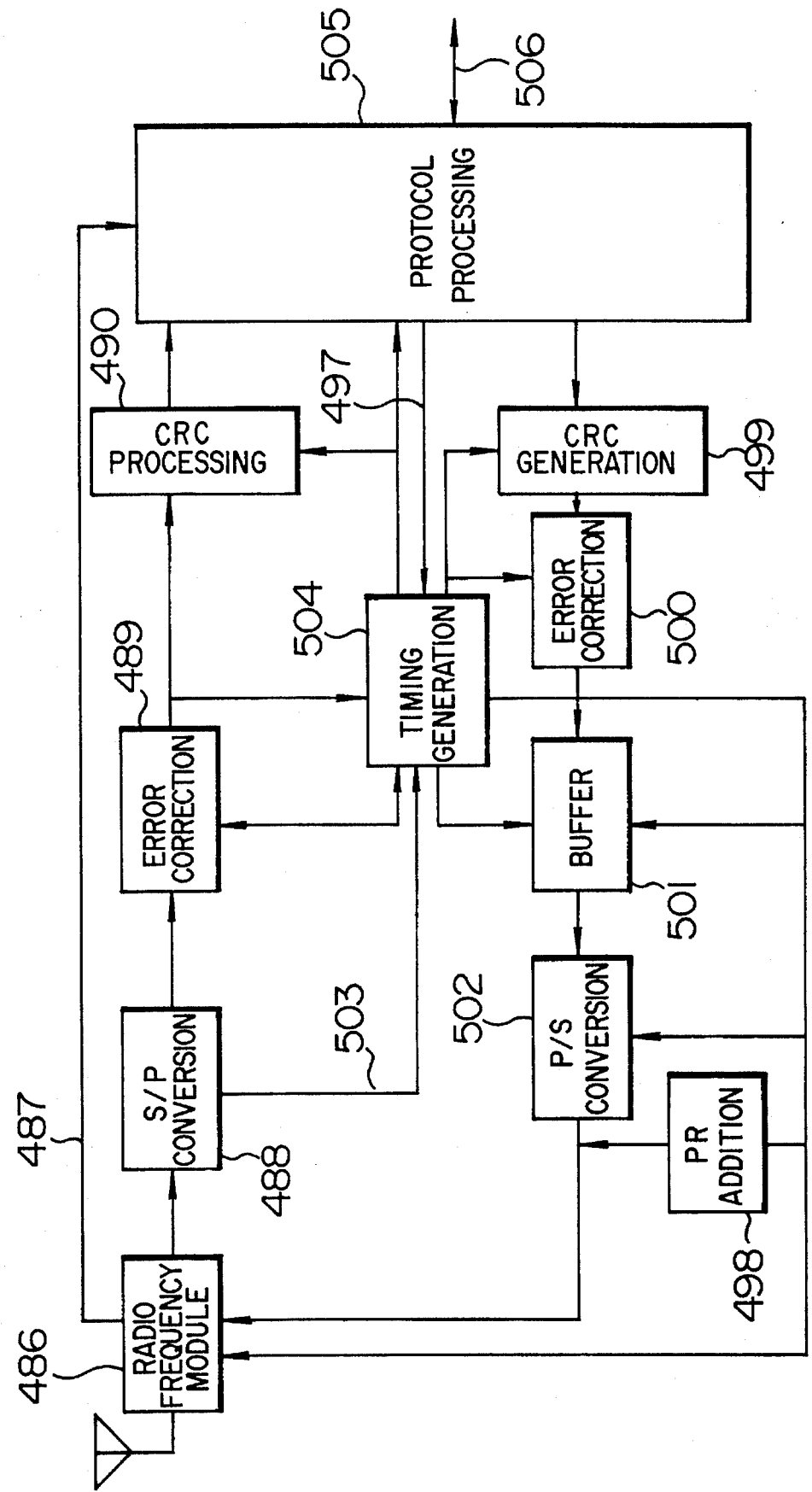
FIG. 24 is a block diagram showing the details of the communication processing unit at a mobile station of the third embodiment.

FIG. 24 is a block diagram showing the detailed structure of a communication processing unit of a mobile station.

The function of the communication processing unit is similar to that of the transmission processing part of a base station described with FIG. 23. In order to simplify the description, only the blocks having different functions will be described in detail. Like blocks to those shown in FIG. 23 are represented by using identical reference numerals.

A timing generator and control circuit 504 detects the timing of each frame generated by a base station in accordance with the frame flag (FF) detecting signal 503 supplied from the S/P converter 488, to frame-synchronize the timing of data transmission. A protocol processing unit 505 analyzes the contents of received data. If the data is directed to the mobile station, it is transferred to a higher layer level interface 506. The protocol processing unit also performs a request issue, a request indication issue, a transmission activation, a data retransmission control responsive to an indication from a base station, a transmission data generation, a base station recognition, an address registration notice, and other processes.

Each mobile station estimates an error rate of data transmitted from a base station basing upon the number of abnormal CRCs. If the error rate exceeds a predetermined value, the mobile station judges that the station has moved from one cell to another cell, and issues an address registration request to the new base station.

Figure 25:
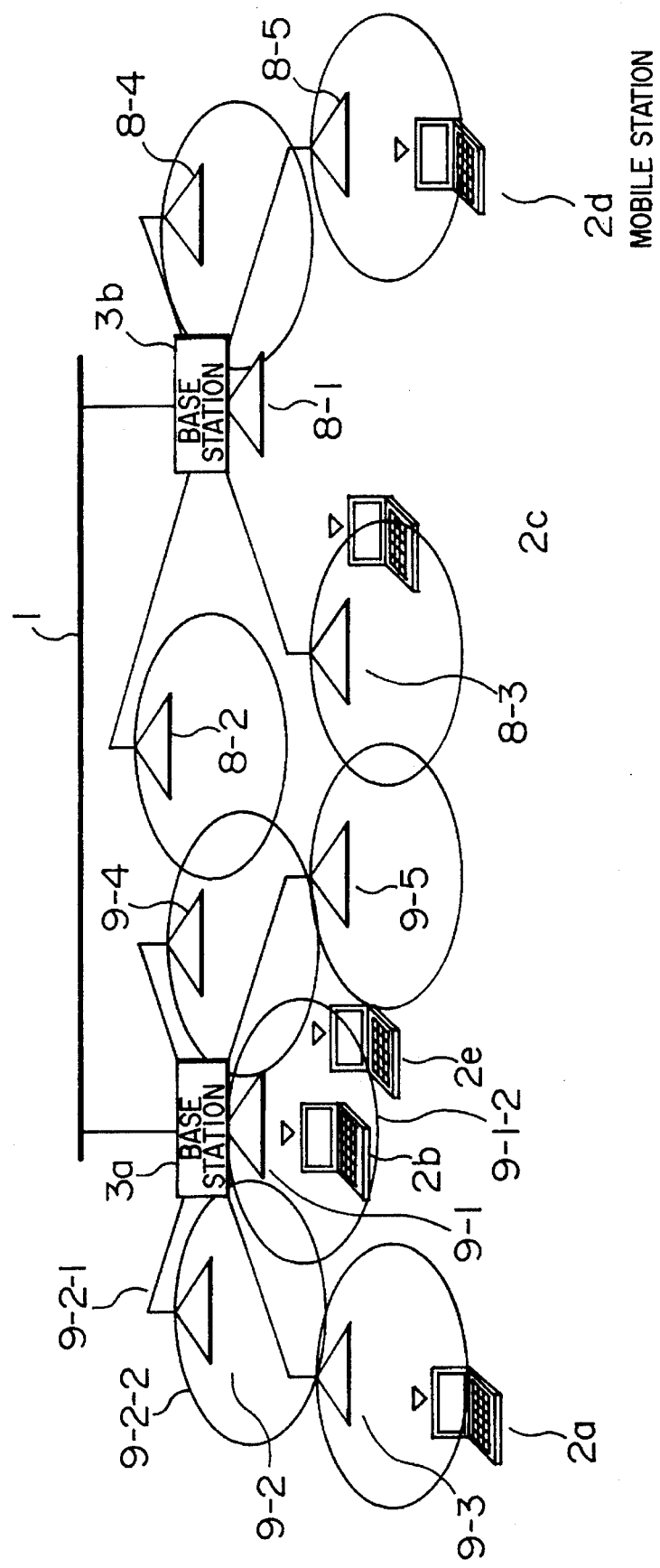
FIG. 25 shows the overall structure of a wireless communication system according to another embodiment of the present invention.

FIG. 25 shows the overall arrangement of a communication system according to the fourth embodiment of the present invention.

Referring to FIG. 25, base stations 3a and 3b are interconnected via a backbone network 1. The base station 3a has a transmission antenna 9-1 and reception antennas 9-2 to 9-5, and the base station 3b has a transmission antenna 8-1 and reception antennas 8-2 to 8-5.

Each reception antenna is wired to the base station via a signal line (e.g., signal line 9-2-1) and covers an area (e.g., an area 9-2-2) about 3 m in radius. Each cover area has a smaller radius than the cell 4a of the second embodiment. This radius is designed such that one bit or more errors in average will be generated in transmitted data when, for example, data transmitted from a mobile station 2b just under the antenna collides with data transmitted from a mobile station positioned at the end of the cover area.

In this embodiment, one cell corresponds to a total area of the cover areas of a plurality of reception antennas connected to one base station. One cell is covered by one transmission antenna.

For each reception antenna, a reception unit (reception antenna unit) is provided which is constituted by a reception unit of the radio frequency module 486, an error correcting circuit 489, and a CRC processing circuit 490 shown in the block diagram of FIG. 23.

Each reception antenna unit receives data of the request field R3 in the case of the frame structure shown in FIG. 15, and receives data of the up-link fragment slot field (UFS) 481 in the case of the frame structure shown in FIG. 22.

The protocol processing unit 485 at each base station processes data received from a plurality of reception antenna units, and processes data to be transmitted from the transmission data. In the case of the frame structure shown in FIG. 15, the contents of the request reply field R2 are transmitted from the transmission antenna 9-1 so that the request reply field is reserved for each reception antenna.

FIG. 26 is a block diagram of a transmission unit of the radio frequency module at each mobile station according to another embodiment of the present invention. This radio frequency module is used in the system configuration shown in FIG. 1 with the frame structure shown in FIG. 15 or FIG. 22.

Transmission data 412 is modulated by a modulator 413 using QPSK. This modulated signal and a carrier outputted from a carrier generator 414 is multiplied by a multiplier 415, amplified by an RF amplifier unit 416 to a predetermined level, and transmitted from the antenna 418.

The transmitting power at an antenna can be changed generally by controlling the gain of an amplifier at the last stage of the RF amplifier unit 416.

In this embodiment, assuming that there are a mobile station just under a base station and a mobile station located at the end of the cell, three transmitting powers are used. The first transmitting power is set such that the mobile station at the end of the cell can survive over the mobile station just under the base station. The second transmitting power is set such that the former mobile station cannot survive over the latter mobile station. The third transmitting power is set to the same or greater than the second transmitting power. The protocol processing unit 506 shown in FIG. 24 selects one of the first to third transmitting powers by changing the gain of the last stage amplifier by a control signal 417.

In the case of the frame structure shown in FIG. 15, the protocol processing unit 506 randomly selects the first or second transmitting power at the request field, and selects the third transmitting power at the other field.

In the case of the frame structure shown in FIG. 22, the first or second transmitting power is randomly selected at the UFS field for data transmission.

According to this embodiment, the request cycle control by a base station is not needed because there is no unfair problem except in the case of a collision of transmitted signals at the same transmitting power. Accordingly, RCI 332 at each FC field of the frame may be fixed to "0" or deleted.

As a modification of the transmitting power control method, although the transmitting powers have been randomly selected in the above embodiment, the powers may be selected in accordance with the priority order assigned to each mobile station. In this case, the transmitting power control can be made at n priority steps by providing n transmitting powers.

As an alternative modification, the structure and position of an antenna at each mobile station and base station may be set such that the distance between the mobile station and base station becomes substantially shorter depending upon the priority order of the mobile station.

As apparent from the above embodiments, according to the present invention, it is possible to provide a multiple access method with high efficiency for a communication system wherein a plurality of substations (mobile stations) transmit information by using fragments under the access control of a control station (base station). Further, it is possible to provide a dynamic transmitting power control depending upon the distance between a substation and a control station to realize a fair and efficient access control. Accordingly, it is possible to provide a simple priority control method independent from the process at the MAC layer level in the access control method assuming a collision of transmission requests from a plurality of substations.

What is claimed is:

1. A communication method for communicating among a base station and a plurality of substations using a communication frame including a frame synchronization field, a request field following the frame synchronization field, and an information field following the request field, the information field including an access permission area and a data area following the access permission area, the communication method comprising the steps of:

transmitting synchronizing information from the base station to the substations in the frame synchronization field;

transmitting access request information from a source substation to the base station in the request field, the source substation being one of the substations and being a substation from which it is desired to transmit data;

transmitting access permission information from the base station to the source substation in the access permission area of the information field; and transmitting data from the source substation to at least one of the base station and a destination substation in the data area of the information field, the destination substation being one of the substations.

2. A communication method according to claim 1, wherein the request field includes a plurality of request slots; and wherein the access request information is transmitted in one of the slots of the request field.

3. A communication method according to claim 2, wherein the information field includes a plurality of slots each including an access permission area and a data area following the access permission area; and wherein the access request information includes a number of slots of the information field required to transmit the data from the source substation.

4. A communication method according to claim 3, wherein the access request information includes an address of the source substation;

wherein the access permission information includes the address of the source substation; and wherein the address of the source substation in the access permission information is obtained from the access request information.

5. A communication method according to claim 2, wherein the access request information includes an address of the source substation;

wherein the access permission information includes the address of the source substation; and wherein the address of the source substation in the access permission information is obtained from the access request information.

6. A communication method according to claim 1, wherein the information field includes a plurality of slots each including an access permission area and a data area following the access permission area; and wherein the access request information includes a number of slots of the information field required to transmit the data from the source substation.

7. A communication method according to claim 6, wherein the access request information includes an address of the source substation;

wherein the access permission information includes the address of the source substation; and wherein the address of the source substation in the access permission information is obtained from the access request information.

8. A communication method according to claim 1, wherein the access request information includes an address of the source substation;

wherein the access permission information includes the address of the source substation; and wherein the address of the source substation in the access permission information is obtained from the access request information.

9. A communication method for communicating among a base station and a plurality of substations using a communication frame including a frame synchronization field, a request field following the frame synchronization field, and an information field following the request field, the information field including a plurality of transmission slots and a plurality of reply slots, each of the reply slots being paired with a respective one of the transmission slots, the communication method comprising the steps of:

transmitting access request information from a source substation to the base station in the request field, the source substation being one of the substations and being a substation from which it is desired to transmit data;

transmitting access permission information from the base station to the source substation in one of the transmission slots of the information field;

transmitting data and a destination address identifying a destination substation from the source substation to at least one of the base station and the destination substation in the transmission slot in which the access permission information was transmitted, the destination substation being one of the substations; and transmitting reply information from the destination substation to at least one of the base station and the source substation in the reply slot paired with the transmission slot in which the access permission information, the data, and the destination address were transmitted.

10. A communication method according to claim 9, wherein the request field includes a plurality of request slots; and wherein the access request information is transmitted in one of the slots of the request field.

11. A communication method according to claim 10, wherein the access request information includes an address of the source substation;

wherein the access permission information includes the address of the source substation; and wherein the address of the source substation in the access permission information is obtained from the access request information.

12. A communication method according to claim 10, wherein the data and the destination address are transmitted from the source substation to the base station and the destination substation;

wherein the reply information indicates whether or not the destination substation has received the data and the destination address from the source substation; and wherein the base station receives the data and the destination address from the source substation, receives the reply information from the destination substation, and retransmits the data and the destination address to the destination substation in another one of the transmission slots in a current communication frame or in one of the transmission slots in a next communication frame if the reply information indicates that the destination substation did not receive the data and the destination address from the source substation.

13. A communication method according to claim 9, wherein the access request information includes an address of the source substation;

wherein the access permission information includes the address of the source substation; and wherein the address of the source substation in the access permission information is obtained from the access request information.

14. A communication method according to claim 13, wherein the data and the destination address are transmitted from the source substation to the base station and the destination substation;

wherein the reply information indicates whether or not the destination substation has received the data and the destination address from the source substation; and wherein the base station receives the data and the destination address from the source substation, receives the reply information from the destination substation, and retransmits the data and the destination address to the destination substation in another one of the transmission slots in a current communication frame or in one of the transmission slots in a next communication frame if the reply information indicates that the destination substation did not receive the data and the destination address from the source substation.

15. A communication method according to claim 9, wherein the data and the destination address are transmitted from the source substation to the base station and the destination substation;

wherein the reply information indicates whether or not the destination substation has received the data and the destination address from the source substation; and wherein the base station receives the data and the destination address from the source substation, receives the reply information from the destination substation, and retransmits the data and the destination address to the destination substation in another one of the transmission slots in a current communication frame or in one of the transmission slots in a next communication frame if the reply information indicates that the destination substation did not receive the data and the destination address from the source substation.

16. A substation in a communication system, the substation being any one of a plurality of substations in the communication system, the substations having mutually different addresses, the communication system including a base station, the base station and the substations communicating with one another using a communication frame, the communication frame including a frame synchronization field, a request field, and an information field, the information field including a plurality of transmission slots, each of the transmission slots including an access permission area and a data area, the base station including means for transmitting synchronizing information to the substation in the frame synchronization field, means for receiving access request information from the substation, and means for transmitting, in response to the received access request information, access permission information to the substation in the access permission area of one of the transmission slots, the substation comprising:

means for receiving the synchronizing information from the base station and identifying the request field based on the received synchronizing information;

means for transmitting the access request information to the base station in the identified request field when it is desired to transmit data from the substation to another one of the substations;

means for receiving the access permission information from the base station; and means for transmitting, in response to the received access permission information, the address of the other substation and at least part of the data to at least one of the base station and the other substation in the data area of the one transmission slot.

17. A substation according to claim 16, wherein the request field includes a plurality of request slots; and wherein the means for transmitting the access request information transmits the access request information to the base station in one of the request slots.

18. A substation according to claim 17, wherein the access request information includes:

the address of the substation; and a number of the transmission slots required to transmit the data from the substation to the other substation.

19. A substation according to claim 17, further comprising:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots.

20. A substation in a communication system, the substation being any one of a plurality of substations in the communication system, the substations having mutually different addresses, the communication system including a base station, the base station and the substations communicating with one another using a communication frame, the communication frame including a frame synchronization field, a request field, and an information field, the information field including a plurality of transmission slots, each of the transmission slots including an access permission area and a data area, the base station including means for transmitting synchronizing information to the substation in the frame synchronization field, means for receiving access request information from the substation, and means for transmitting, in response to the received access request information, access permission information to the substation in the access permission area of one of the transmission slots, the substation comprising:

means for receiving the synchronizing information from the base station and identifying the request field based on the received synchronizing information;

means for transmitting the access request information to the base station in the identified request field when it is desired to transmit data from the substation to another one of the substations;

means for receiving the access permission information from the base station; and means for transmitting, in response to the received access permission information, the address of the other substation and at least part of the data to at least one of the base station and the other substation in the data area of the one transmission slot;

wherein the request field includes a plurality of request slots;

wherein the means for transmitting the access request information transmits the access request information to the base station in one of the request wherein the substation further comprises:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots;

wherein the information field further includes a plurality of reply slots, each of the reply slots being paired with a respective one of the transmission slots; and wherein the substation further comprises:

means for determining if the received data was correctly received; and means for transmitting, if the received data was not correctly received, reply information indicating that the received data was not correctly received to at least one of the base station and the other substation in the reply slot paired with the transmission slot in which the received data was transmitted by the other substation.

21. A substation according to claim 16, wherein the access request information includes:

the address of the substation; and a number of the transmission slots required to transmit the data from the substation to the other substation.

22. A substation according to claim 21, further comprising:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots.

23. A substation in a communication system, the substation being any one of a plurality of substations in the communication system, the substations having mutually different addresses, the communication system including a base station, the base station and the substations communicating with one another using a communication frame, the communication frame including a frame synchronization field, a request field, and an information field, the information field including a plurality of transmission slots, each of the transmission slots including an access permission area and a data area, the base station including means for transmitting synchronizing information to the substation in the frame synchronization field, means for receiving access request information from the substation, and means for transmitting, in response to the received access request information, access permission information to the substation in the access permission area of one of the transmission slots, the substation comprising:

means for receiving the synchronizing information from the base station and identifying the request field based on the received synchronizing information;

means for transmitting the access request information to the base station in the identified request field when it is desired to transmit data from the substation to another one of the substations;

means for receiving the access permission information from the base station; and means for transmitting, in response to the received access permission information, the address of the other substation and at least part of the data to at least one of the base station and the other substation in the data area of the one transmission slot;

wherein the access request information includes:

the address of the substation; and a number of the transmission slots required to transmit the data from the substation to the other substation;

wherein the substation further comprises:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots;

wherein the information field further includes a plurality of reply slots, each of the reply slots being paired with a respective one of the transmission slots; and wherein the substation further comprises:

means for determining if the received data was correctly received; and means for transmitting, if the received data was not correctly received, reply information indicating that the received data was not correctly received to at least one of the base station and the other substation in the reply slot paired with the transmission slot in which the received data was transmitted by the other substation.

24. A substation according to claim 16, further comprising:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots.

25. A substation in a communication system, the substation being any one of a plurality of substations in the communication system, the substations having mutually different addresses, the communication system including a base station, the base station and the substations communicating with one another using a communication frame, the communication frame including a frame synchronization field, a request field, and an information field, the information field including a plurality of transmission slots, each of the transmission slots including an access permission area and a data area, the base station including means for transmitting synchronizing information to the substation in the frame synchronization field, means for receiving access request information from the substation, and means for transmitting, in response to the received access request information, access permission information to the substation in the access permission area of one of the transmission slots, the substation comprising:

means for receiving the synchronizing information from the base station and identifying the request field based on the received synchronizing information;

means for transmitting the access request information to the base station in the identified request field when it is desired to transmit data from the substation to another one of the substations;

means for receiving the access permission information from the base station; and means for transmitting, in response to the received access permission information, the address of the other substation and at least part of the data to at least one of the base station and the other substation in the data area of the one transmission slot;

wherein the substation further comprises:

means for detecting if the address of the substation is present in the data area of any one of the transmission slots, thereby indicating that another one of the substations has transmitted the address of the substation and data to be received by the substation in the data area of the one transmission slot; and means for receiving the data which has been transmitted by the other substation if the address of the substation is present in the data area of any one of the transmission slots;

wherein the information field further includes a plurality of reply slots, each of the reply slots being paired with a respective one of the transmission slots; and wherein the substation further comprises:

means for determining if the received data was correctly received; and means for transmitting, if the received data was not correctly received, reply information indicating that the received data was not correctly received to at least one of the base station and the other substation in the reply slot paired with the transmission slot in which the received data was transmitted by the other substation.

* * * * *